United States Patent
Watanabe

(10) Patent No.: US 8,436,865 B2
(45) Date of Patent: May 7, 2013

(54) MEMORY CONTROLLER AND MEMORY SYSTEM USING THE SAME

(75) Inventor: Yasuhiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 249 days.

(21) Appl. No.: 12/877,574

(22) Filed: Sep. 8, 2010

(65) Prior Publication Data

US 2010/0328330 A1     Dec. 30, 2010

Related U.S. Application Data

(63) Continuation of application No. PCT/JP2008/000625, filed on Mar. 18, 2008.

(51) Int. Cl.
  *G09G 5/39*     (2006.01)
  *G06T 1/60*     (2006.01)

(52) U.S. Cl.
  USPC .......................................................... 345/531

(58) Field of Classification Search .................. 345/530, 345/531
  See application file for complete search history.

(56) References Cited

U.S. PATENT DOCUMENTS

| 5,587,807 | A  | 12/1996 | Ootsuka et al. |
| 7,961,195 | B1* | 6/2011 | Rogers et al. .................. 345/555 |
| 2002/0023205 | A1 | 2/2002 | Kondo et al. |

FOREIGN PATENT DOCUMENTS

| JP | 7-105638 | 4/1995 |
| JP | 7-281949 | 10/1995 |
| JP | 2002-63070 | 2/2002 |
| JP | 2005-32035 | 2/2005 |

OTHER PUBLICATIONS

International Search Report for PCT/JP2008/000625, mailed May 13, 2008.

* cited by examiner

*Primary Examiner* — Jacinta M Crawford

(74) *Attorney, Agent, or Firm* — Staas & Halsey LLP

(57) ABSTRACT

According to an aspect of embodiment, a memory controller for controlling a memory having areas of data unit of K bits, includes a data mapping unit dividing N bits of data, where N is not a multiple of K, into K bits and (N−K) bits, and in regard to L pieces of the data, arranging L K-bit data into L data units, and arranging L (N−K)-bit data into M (M=L×(N−K)/K) data units by packing; and an access control unit access-controlling the memory to access the L K-bit data as L data units, and access-controlling the memory to access the packed L (N−K)-bit data as M data units.

17 Claims, 30 Drawing Sheets

FIG.4A 12-1

(10)-bit ACCESS

| ADDRESS | READOUT START PIXEL POSITION PD |||||||||||||||| 
|---|---|---|---|---|---|---|---|---|---|---|---|---|---|---|---|---|
| | PD0 | PD1 | PD2 | PD3 | PD4 | PD5 | PD6 | PD7 | PD8 | PD9 | PD10 | PD11 | PD12 | PD13 | PD14 | PD15 |
| | 0 | 0 | 0 | 0 | 4 | 4 | 4 | 8 | 8 | 8 | 12 | 12 | 12 | 16 | 16 | 16 |
| | 4 | 4 | 4 | 4 | 8 | 8 | 8 | 12 | 12 | 12 | 16 | 16 | 16 | 20 | 20 | 20 |
| | 8 | 8 | 8 | 8 | 12 | 12 | 12 | 16 | 16 | 16 | 20 | 20 | 20 | 24 | 24 | 24 |
| | 12 | 12 | 12 |   |   |   |   |   |   |   |   |   | 24 |   |   | 28 |

FIG.4B (8)-bit ACCESS

| ADDRESS | READOUT START PIXEL POSITION PD |||||||||||||||| 
|---|---|---|---|---|---|---|---|---|---|---|---|---|---|---|---|---|
| | PD0 | PD1 | PD2 | PD3 | PD4 | PD5 | PD6 | PD7 | PD8 | PD9 | PD10 | PD11 | PD12 | PD13 | PD14 | PD15 |
| | 0 | 0 | 0 | 0 | 4 | 4 | 4 | 8 | 8 | 8 | 12 | 12 | 12 | 16 | 16 | 16 |
| | 4 | 4 | 4 | 4 | 8 | 8 | 8 | 12 | 12 | 12 | 16 | 16 | 16 | 20 | 20 | 20 |
| | 8 | 8 | 8 | 8 | 12 | 12 | 12 | 16 | 16 | 16 | 20 | 20 | 20 | 24 | 24 | 24 |
| | 12 |   |   |   |   |   |   |   |   |   |   |   | 24 |   |   | 28 |

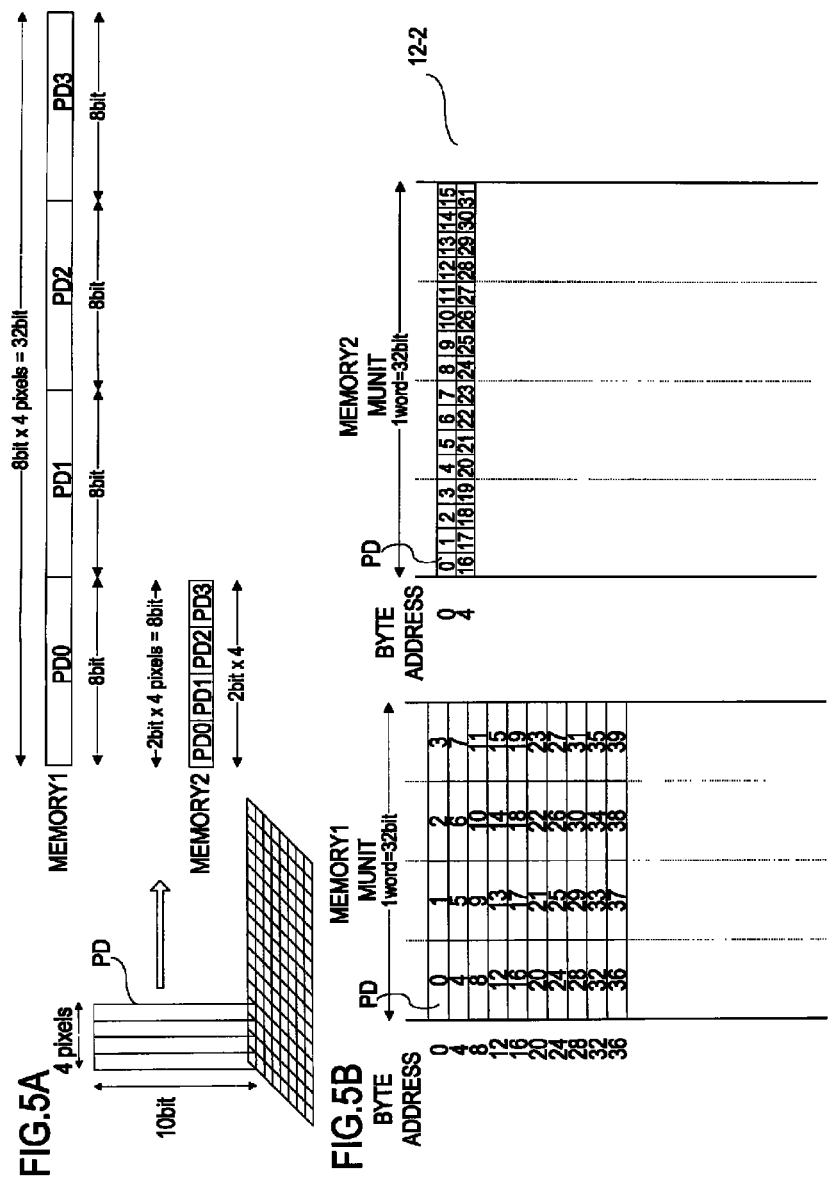

FIG.6A 12-2

(10)-bit ACCESS

| ADDRESS | PD0 | PD1 | PD2 | PD3 | PD4 | PD5 | PD6 | PD7 | PD8 | PD9 | PD10 | PD11 | PD12 | PD13 | PD14 | PD15 |
|---|---|---|---|---|---|---|---|---|---|---|---|---|---|---|---|---|
| | 0 | 0 | 0 | 0 | 4 | 4 | 4 | 4 | 8 | 8 | 8 | 8 | 8 | 8 | 8 | 8 |
| | 4 | 4 | 4 | 4 | 8 | 8 | 8 | 8 | 12 | 12 | 12 | 12 | 16 | 16 | 16 | 16 |
| | 0 | 8 | 8 | 8 | 0 | 12 | 12 | 12 | 0 | 16 | 16 | 16 | 0 | 20 | 20 | 20 |
| | | 0 | 0 | 0 | | 0 | 0 | 0 | | 0 | 0 | 0 | 4 | 0 | 0 | 0 |
| | | | | | | | | | | 4 | 4 | 4 | | 4 | 4 | 4 |

READOUT START PIXEL POSITION PD

FIG.6B (8)-bit ACCESS

| ADDRESS | PD0 | PD1 | PD2 | PD3 | PD4 | PD5 | PD6 | PD7 | PD8 | PD9 | PD10 | PD11 | PD12 | PD13 | PD14 | PD15 |
|---|---|---|---|---|---|---|---|---|---|---|---|---|---|---|---|---|
| | 0 | 0 | 0 | 0 | 4 | 4 | 4 | 4 | 8 | 8 | 8 | 8 | 8 | 8 | 8 | 8 |
| | 4 | 4 | 4 | 4 | 8 | 8 | 8 | 8 | 12 | 12 | 12 | 12 | 16 | 16 | 16 | 16 |
| | 8 | 8 | 8 | 8 | 12 | 12 | 12 | 12 | 16 | 16 | 16 | 16 | 20 | 20 | 20 | 20 |

READOUT START PIXEL POSITION PD

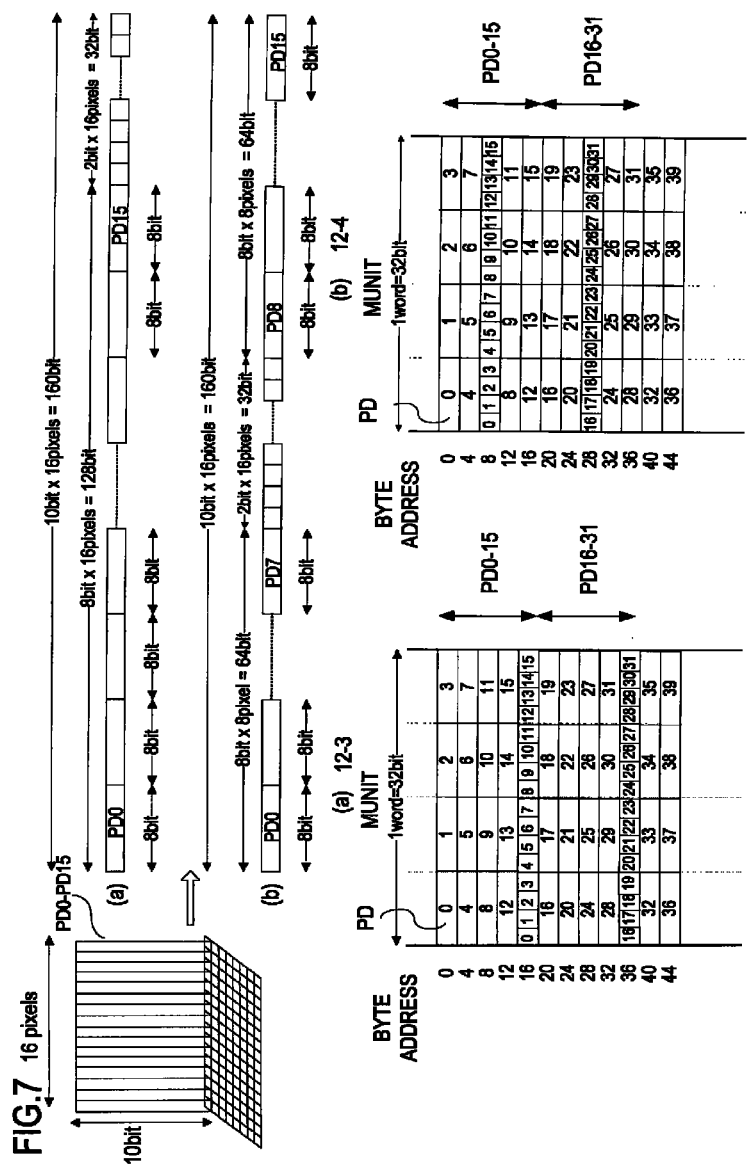

12-3

FIG.8A (10)-bit ACCESS

READOUT START PIXEL POSITION PD

| ADDRESS | PD0 | PD1 | PD2 | PD3 | PD4 | PD5 | PD6 | PD7 | PD8 | PD9 | PD10 | PD11 | PD12 | PD13 | PD14 | PD15 |
|---------|-----|-----|-----|-----|-----|-----|-----|-----|-----|-----|------|------|------|------|------|------|
| 0 | 0 | 0 | 0 | 0 | 4 | 4 | 4 | 4 | 8 | 8 | 8 | 8 | 12 | 12 | 12 | 12 |
| 4 | 4 | 4 | 4 | 4 | 8 | 8 | 8 | 8 | 12 | 12 | 12 | 12 | 16 | 16 | 16 | 16 |
| 8 | 8 | 8 | 8 | 8 | 12 | 12 | 12 | 12 | 16 | 16 | 16 | 16 | 20 | 20 | 20 | 20 |
| 16 | 16 | 16 | 16 | 16 | | | | | | 20 | 20 | 20 | 24 | 24 | 24 | 24 |
| | | | | | | | | | | 36 | 36 | 36 | 36 | 36 | 36 | 36 |

FIG.8B (8)-bit ACCESS

READOUT START PIXEL POSITION PD

| ADDRESS | PD0 | PD1 | PD2 | PD3 | PD4 | PD5 | PD6 | PD7 | PD8 | PD9 | PD10 | PD11 | PD12 | PD13 | PD14 | PD15 |
|---------|-----|-----|-----|-----|-----|-----|-----|-----|-----|-----|------|------|------|------|------|------|
| 0 | 0 | 0 | 0 | 0 | 4 | 4 | 4 | 4 | 8 | 8 | 8 | 8 | 12 | 12 | 12 | 12 |
| 4 | 4 | 4 | 4 | 8 | 8 | 8 | 8 | 12 | 12 | 12 | 12 | 12 | 20 | 20 | 20 | 20 |
| | | | | | | | | | | | | 20 | 24 | 24 | 24 | 24 |

12-4

FIG.9A (10)-bit ACCESS

| ADDRESS | READOUT START PIXEL POSITION PD | | | | | | | | | | | | | | | |
|---|---|---|---|---|---|---|---|---|---|---|---|---|---|---|---|---|
| | PD0 | PD1 | PD2 | PD3 | PD4 | PD5 | PD6 | PD7 | PD8 | PD9 | PD10 | PD11 | PD12 | PD13 | PD14 | PD15 |
| | 0 | 0 | 0 | 0 | 4 | 4 | 4 | 4 | 8 | 8 | 8 | 8 | 8 | 8 | 8 | 8 |
| | 4 | 4 | 4 | 4 | 8 | 8 | 8 | 8 | 12 | 12 | 12 | 12 | 16 | 16 | 16 | 16 |
| | 8 | 8 | 8 | 8 | 12 | 12 | 12 | 12 | 16 | 16 | 16 | 16 | 20 | 20 | 20 | 20 |
| | 12 | 12 | 12 | 12 | | 16 | 16 | 16 | | 20 | 20 | 20 | 28 | 24 | 24 | 24 |
| | | | | | | | | | | 28 | 28 | 28 | | 28 | 28 | 28 |

FIG.9B (8)-bit ACCESS

| ADDRESS | READOUT START PIXEL POSITION PD | | | | | | | | | | | | | | | |
|---|---|---|---|---|---|---|---|---|---|---|---|---|---|---|---|---|
| | PD0 | PD1 | PD2 | PD3 | PD4 | PD5 | PD6 | PD7 | PD8 | PD9 | PD10 | PD11 | PD12 | PD13 | PD14 | PD15 |
| | 0 | 0 | 0 | 0 | 4 | 4 | 4 | 4 | 12 | 12 | 12 | 12 | 16 | 16 | 16 | 16 |
| | 4 | 4 | 4 | 4 | 12 | 12 | 12 | 12 | 16 | 16 | 16 | 16 | 20 | 20 | 20 | 20 |
| | 12 | 12 | 12 | 12 | 16 | 16 | 16 | 16 | 20 | 20 | 20 | 20 | 24 | 24 | 24 | 24 |

(10)-bit ACCESS          12-5 (BYTE BOUNDARY)

READOUT START PIXEL POSITION PD

| ADDRESS | PD0 | PD1 | PD2 | PD3 | PD4 | PD5 | PD6 | PD7 | PD8 | PD9 | PD10 | PD11 | PD12 | PD13 | PD14 | PD15 |
|---|---|---|---|---|---|---|---|---|---|---|---|---|---|---|---|---|
| 0 | 0 | 1 | 2 | 3 | 5 | 6 | 7 | 8 | 10 | 11 | 12 | 13 | 15 | 16 | 17 | 18 |
| 4 | 4 | 5 | 6 | 7 | 9 | 10 | 11 | 12 | 14 | 15 | 16 | 17 | 19 | 20 | 21 | 22 |
| 8 | 8 | 9 | 10 | 11 | 13 | 14 | 15 | 16 | 18 | 19 | 20 | 21 | 23 | 24 | 25 | 26 |
|   | 13 | 14 |   |   | 18 | 19 |   |   | 23 | 24 |   |   | 28 | 29 |   |   |

FIG.11B

(8)-bit ACCESS

READOUT START PIXEL POSITION PD

| ADDRESS | PD0 | PD1 | PD2 | PD3 | PD4 | PD5 | PD6 | PD7 | PD8 | PD9 | PD10 | PD11 | PD12 | PD13 | PD14 | PD15 |
|---|---|---|---|---|---|---|---|---|---|---|---|---|---|---|---|---|
| 0 | 0 | 0 | 0 | 0 | 5 | 5 | 5 | 5 | 10 | 10 | 10 | 10 | 15 | 15 | 15 | 15 |
| 5 | 5 | 5 | 5 | 5 | 10 | 10 | 10 | 10 | 15 | 15 | 15 | 15 | 20 | 20 | 20 | 20 |
| 10 | 10 | 10 | 10 | 10 | 15 | 15 | 15 | 15 | 20 | 20 | 20 | 20 | 25 | 25 | 25 | 25 |

FIG.12A 12-6 (BYTE BOUNDARY)

(10)-bit ACCESS

| ADDRESS | READOUT START PIXEL POSITION PD ||||||||||||||||
|---|---|---|---|---|---|---|---|---|---|---|---|---|---|---|---|---|
| | PD0 | PD1 | PD2 | PD3 | PD4 | PD5 | PD6 | PD7 | PD8 | PD9 | PD10 | PD11 | PD12 | PD13 | PD14 | PD15 |
| | 0 | 1 | 2 | 2 | 5 | 6 | 7 | 7 | 10 | 11 | 12 | 12 | 15 | 16 | 17 | 17 |
| | 4 | 5 | 6 | 6 | 9 | 10 | 11 | 11 | 14 | 15 | 16 | 16 | 19 | 20 | 21 | 21 |
| | 8 | 9 | 10 | 10 | 13 | 14 | 15 | 15 | 18 | 19 | 20 | 20 | 23 | 24 | 25 | 25 |
| | | | | | | | | | | | | | | | | |
| | | | | | | | | | | | | | | | | |
| | | | | | | | | | | | | | | | | |

FIG.12B (8)-bit ACCESS

| ADDRESS | READOUT START PIXEL POSITION PD ||||||||||||||||
|---|---|---|---|---|---|---|---|---|---|---|---|---|---|---|---|---|
| | PD0 | PD1 | PD2 | PD3 | PD4 | PD5 | PD6 | PD7 | PD8 | PD9 | PD10 | PD11 | PD12 | PD13 | PD14 | PD15 |
| | 0 | 0 | 3 | 3 | 3 | 3 | 8 | 8 | 8 | 8 | 13 | 13 | 13 | 13 | 16 | 16 |
| | 3 | 3 | 8 | 8 | 8 | 8 | 13 | 13 | 13 | 13 | 18 | 18 | 18 | 18 | 21 | 21 |
| | 8 | 8 | 13 | 13 | 13 | 13 | 18 | 18 | 18 | 18 | 23 | 23 | 23 | 23 | 25 | 25 |
| | | | | | | | | | | | | | | | | |
| | | | | | | | | | | | | | | | | |
| | | | | | | | | | | | | | | | | |

FIG.14A (10)-bit ACCESS  12-1 (BYTE BOUNDARY)

| ADDRESS | READOUT START PIXEL POSITION PD |||||||||||||||| |
|---|---|---|---|---|---|---|---|---|---|---|---|---|---|---|---|
| | PD0 | PD1 | PD2 | PD3 | PD4 | PD5 | PD6 | PD7 | PD8 | PD9 | PD10 | PD11 | PD12 | PD13 | PD14 | PD15 |
| 0 | 0 | 1 | 2 | 3 | 5 | 6 | 7 | 8 | 10 | 11 | 12 | 13 | 15 | 16 | 17 | 18 |
| 4 | 4 | 5 | 6 | 7 | 9 | 10 | 11 | 12 | 14 | 15 | 16 | 17 | 19 | 20 | 21 | 22 |
| 8 | 8 | 9 | 10 | 11 | 13 | 14 | 15 | 16 | 18 | 19 | 20 | 21 | 23 | 24 | 25 | 26 |

FIG.14B (8)-bit ACCESS

| ADDRESS | READOUT START PIXEL POSITION PD |||||||||||||||| |
|---|---|---|---|---|---|---|---|---|---|---|---|---|---|---|---|
| | PD0 | PD1 | PD2 | PD3 | PD4 | PD5 | PD6 | PD7 | PD8 | PD9 | PD10 | PD11 | PD12 | PD13 | PD14 | PD15 |
| 0 | 0 | 1 | 2 | 3 | 5 | 6 | 7 | 8 | 10 | 11 | 12 | 13 | 15 | 16 | 17 | 18 |
| 4 | 4 | 5 | 6 | 7 | 9 | 10 | 11 | 12 | 14 | 15 | 16 | 17 | 19 | 20 | 21 | 22 |
| 8 | 8 | 9 | 10 | 11 | 13 | 14 | 15 | 16 | 18 | 19 | 20 | 21 | 23 | 24 | 25 | 26 |

FIG.15A (10)-bit ACCESS — 12-2 (BYTE BOUNDARY)

| ADDRESS | READOUT START PIXEL POSITION PD ||||||||||||||||
| --- | --- | --- | --- | --- | --- | --- | --- | --- | --- | --- | --- | --- | --- | --- | --- | --- |
|  | PD0 | PD1 | PD2 | PD3 | PD4 | PD5 | PD6 | PD7 | PD8 | PD9 | PD10 | PD11 | PD12 | PD13 | PD14 | PD15 |
|  | 0 | 1 | 2 | 3 | 4 | 5 | 6 | 7 | 8 | 9 | 10 | 11 | 12 | 13 | 14 | 15 |
|  | 4 | 5 | 6 | 7 | 8 | 9 | 10 | 11 | 12 | 13 | 14 | 15 | 16 | 17 | 18 | 19 |
|  | 0 | 0 | 0 | 0 | 1 | 1 | 1 | 1 | 2 | 2 | 2 | 2 | 3 | 3 | 3 | 3 |

FIG.15B (8)-bit ACCESS

| ADDRESS | READOUT START PIXEL POSITION PD ||||||||||||||||
| --- | --- | --- | --- | --- | --- | --- | --- | --- | --- | --- | --- | --- | --- | --- | --- | --- |
|  | PD0 | PD1 | PD2 | PD3 | PD4 | PD5 | PD6 | PD7 | PD8 | PD9 | PD10 | PD11 | PD12 | PD13 | PD14 | PD15 |
|  | 0 | 1 | 2 | 3 | 4 | 5 | 6 | 7 | 8 | 9 | 10 | 11 | 12 | 13 | 14 | 15 |
|  | 4 | 5 | 6 | 7 | 8 | 9 | 10 | 11 | 12 | 13 | 14 | 15 | 16 | 17 | 18 | 19 |

9bit (N=9, L=8, M=1)

1 word = 32bit

| Byte Address | | | | |
|---|---|---|---|---|
| 0 | 0 | 1 | 2 | 3 |
| 4 | 0-7 | 4 | 5 | 6 |
| 8 | 7 | 8 | 9 | 10 |
| 12 | 11 | 8-15 | 12 | 13 |
| 16 | 14 | 15 | 16 | 17 |
| 20 | 18 | 19 | 16-23 | 20 |
| 24 | 21 | 22 | 23 | 24 |
| 28 | 25 | 26 | 27 | 24-31 |
| 32 | 28 | 29 | 30 | 31 |
| 36 | 32-39 | 32 | 33 | 34 |
| 40 | 35 | 36 | 37 | 38 |

FIG.17B 12-6

11bit (N=11, L=8, M=3)

1 word = 32bit

| Byte Address | | | | |
|---|---|---|---|---|
| 0 | 0 | 1 | 2 | 3 |
| 4 | 0-7 | 4 | |
| 8 | 5 | 6 | 7 | 8 |
| 12 | 9 | 10 | 11 | 8-15 |
| 16 | 8-15 | 14 | 15 | 12 | 13 |
| 20 | 18 | 19 | 16 | 17 |
| 24 | 16-23 | 20 | 21 | 22 |
| 28 | 23 | 24 | 25 | 26 |
| 32 | 27 | 24-31 | 28 | |
| 36 | 28 | 29 | 30 | 31 |
| 40 | 32-39 | 32 | |
| 44 | 33 | 34 | 35 | 36 |
| 48 | | | | |

FIG.17C

12bit (N=12, L=4, M=2)

1 word = 32bit

| Byte Address | | | | |
|---|---|---|---|---|
| 0 | 0 | 1 | 0-3 | |
| 4 | 2 | 3 | 4 | 5 |
| 8 | 4-7 | | 6 | 7 |
| 12 | 8 | 9 | 8-11 | |
| 16 | 10 | 11 | 12 | 13 |
| 20 | 12-15 | | 14 | 15 |
| 24 | 16 | 17 | 16-19 | |
| 28 | 18 | 19 | 20 | 21 |
| 32 | 20-23 | | 22 | 23 |
| 36 | 24 | 25 | 24-27 | |
| 40 | 26 | 27 | 28 | 29 |
| 44 | 28-31 | | 30 | 31 |

Figure 18:
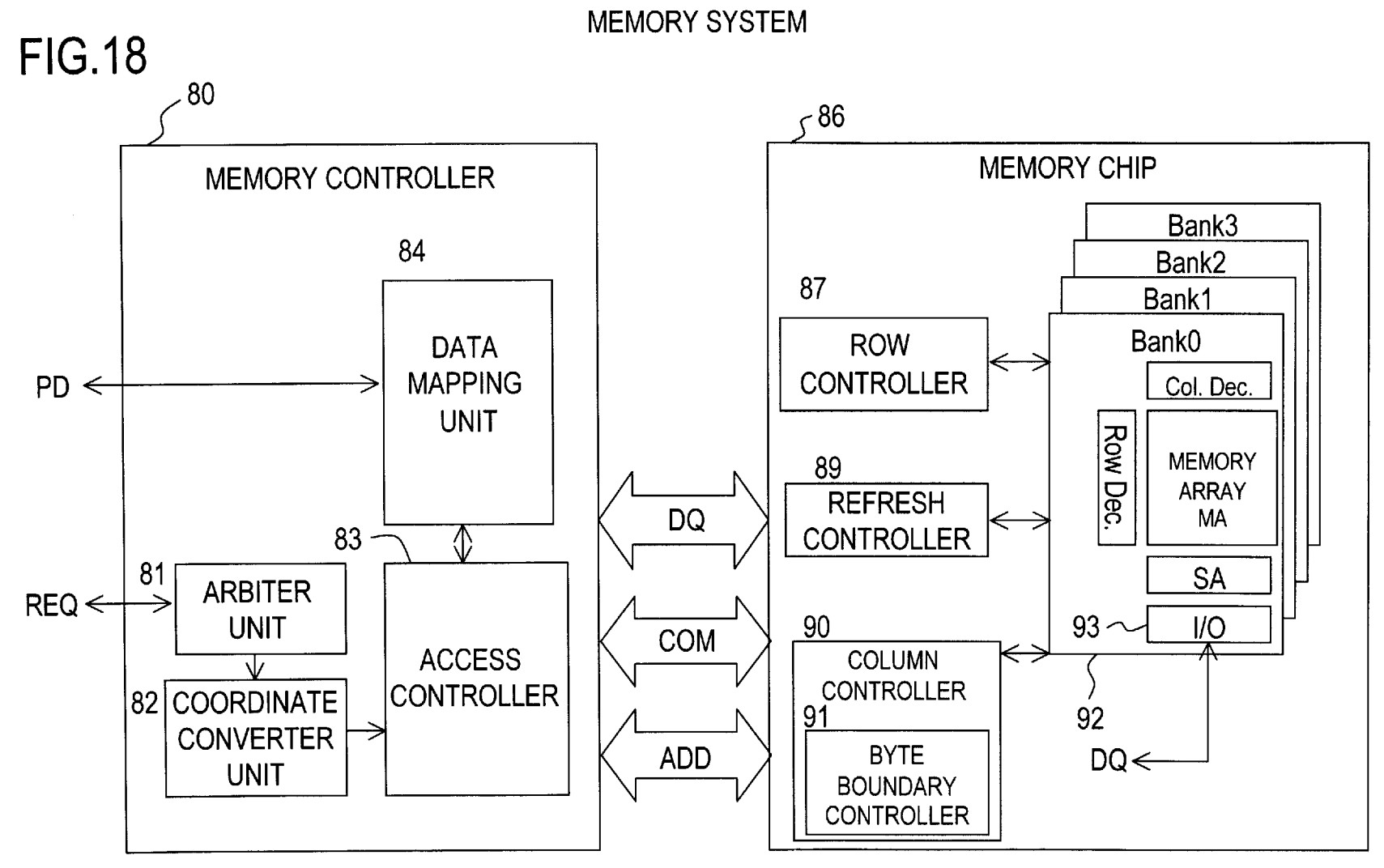

```
MEMORY SYSTEM

MEMORY CHIP ~86
  Bank0/Bank1/Bank2/Bank3
    Col. Dec.
    MEMORY ARRAY MA
    Row Dec.
    SA
    I/O ~93
    DQ ~92
  87 ROW CONTROLLER
  89 REFRESH CONTROLLER
  90 COLUMN CONTROLLER
  91 BYTE BOUNDARY CONTROLLER

⇕ DQ   ⇕ COM   ⇕ ADD

MEMORY CONTROLLER ~80
  84 DATA MAPPING UNIT
  83 ACCESS CONTROLLER
  81 ARBITER UNIT
  82 COORDINATE CONVERTER UNIT
  PD
  REQ
```

MEMORY CONTROLLER AND MEMORY SYSTEM USING THE SAME

CROSS REFERENCE TO RELATED APPLICATIONS

This application is a continuation of International Application No. PCT/JP 2008/000625, filed on Mar. 18, 2008, now pending, herein incorporated by reference.

FIELD

The present invention relates to a memory controller and a memory system using the same, and more particularly a memory controller for processing data having a bit length (N bits, for example 10 bits and 12 bits) other than a multiple of a data unit bit length (K bits, for example 8 bits), and a memory system using the same.

BACKGROUND

An image data composed of two-dimensionally arrayed pixels is a set of a plurality of bits of pixel data. The pixel data may be composed of a luminance signal Y and color difference signals Cb, Cr, or may be composed of RGB gradation signals. Each signal generally consists of 8 bits (1 byte).

Now, with regard to the memory for storing the image data, for example a general-purpose memory such as SDRAM, the internal circuit thereof is composed of an 8-bit (1-byte) data unit. Therefore, the data bus width of the general-purpose memory is a multiple of 8 i.e. the bit length of the data unit, namely, 8 bits, 16 bits, 32 bits or 64 bits. In other words, in response to an address supplied from a memory controller, the general-purpose memory inputs and outputs data having the bit length in the above data bus width. As such, an area for storing data having the bit length selected by the address is referred to as a memory unit area. Accordingly, the memory unit area is composed of a multiple of 8 bits (1 byte) corresponding to the number of bits in the data bus width of the memory. Also, the data bus width, namely, the number of bits in the memory unit area corresponds to the bit length of one word.

In recent years, accompanying the enhancement of image quality, the pixel data has a bit length that exceeds 8 bits, such as 10 bits and 12 bits. In such pixel data of high image quality, the bit length thereof other than a multiple of 8 bits brings about an impediment to access efficiency to the general-purpose memory. For example, with regard to pixel data each consisting of 10 bits, it is necessary to handle 4 pixel data as data consisting of 5 bytes (8×5=40 bits). Incase that a bit length of one word, namely data bus width, is 32 bits, it is necessary to input and output 16 pixel data as data consisting of 5 words, by accessing the memory five times.

In the Japanese Unexamined Patent Publication No. 2005-32035, when storing, into a memory, data having a unit data bit length of 10 bits or 12 bits, which is not a multiple of 8, it is described that a second memory is used, or alternatively, data each consisting of 10 bits or 12 bits are stored into a single memory by successively packing the above data. For this purpose, a plurality of buffer registers are provided in a memory access circuit, and input data stored in the plurality of buffer registers are appropriately selected, so as to match with a memory data bus width.

In the Japanese Unexamined Patent Publication No. Hei-7-105638, it is described that, by dividing a 10-bit image data into an upper 8 bits and a lower 2 bits, the upper 8 bits are stored into a magnetic tape intact, while in regard to the lower 2 bits, 4 samples are packed to compose 8 bits, and after adding an error correction parity, the data is recorded into the magnetic tape. By this, it is explained that the image quality can be improved by means of error correction.

SUMMARY

When the bit length of pixel data is N bits in excess of a data unit bit length (8 bits), and is not a multiple of the data unit bit length, there are mixed cases in data processing: processing each data on the basis of N bits and processing on the basis of each upper 8 bits of the data. In such a case that the pixel data bit length is not coincident with the memory data unit and the data bus width, it is difficult to increase memory access efficiency corresponding to the above two types of processing.

As suggested in the Japanese Unexamined Patent Publication No. 2005-32035, by use of two memory chips, the upper 8 bits are recorded into a first memory chip and the lower 2 bits are recorded into a second memory chip. Then, according to the bit length to be accessed, it may be possible to switch either to access only the first memory chip or to access both the first and second memory chips. However, it is undesirable to use two memory chips because the image processing system becomes large in scale.

According to an aspect of the embodiment, a memory controller for controlling a memory having areas of data unit of K bits, includes:

a data mapping unit dividing N bits of data, where N is not a multiple of K, into K bits and (N−K) bits, and in regard to L pieces of the data, arranging L K-bit data into L data units, and arranging L (N−K)-bit data into M (M=L×(N−K)/K) data units by packing; and an access control unit access-controlling the memory to access the L K-bit data as L data units, and access-controlling the memory to access the packed L (N−K)-bit data as M data units, wherein the access control unit stores the L K-bit data and the packed L (N−K)-bit data into consecutive (L+M) data unit areas in the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating access efficiency in the first memory mapping shown in FIG. 3.

FIG. 5 is a diagram illustrating second memory mapping of pixel data.

FIG. 6 is a diagram illustrating access efficiency in the second memory mapping shown in FIG. 5.

FIG. 7 is a diagram illustrating memory mapping according to the present embodiments.

FIG. 8 is a diagram illustrating access efficiency according to the third memory map 12-3 shown in FIG. 7(*a*).

FIG. 9 is a diagram illustrating access efficiency according to the fourth memory map 12-4 shown in FIG. 7(*b*).

FIG. 10 is a diagram illustrating memory mapping according to the present embodiment.

FIG. 11 is a diagram illustrating access efficiency according to the fifth memory map 12-5 shown in FIG. 10(a).

FIG. 12 is a diagram illustrating access efficiency according to the sixth memory map 12-6 shown in FIG. 10B.

FIG. 14 is a diagram illustrating access efficiency when the byte boundary access is used in the first memory map.

FIG. 15 is a diagram illustrating access efficiency when the byte boundary access is used in the second memory map.

FIG. 16 is exemplary variations of the fourth memory map.

FIG. 17 is exemplary variations of the sixth memory map.

FIG. 18 is a memory system configuration according to the present embodiment.

DESCRIPTION OF EMBODIMENT

[Memory Map and Memory Byte Boundary Function]

Figure 1:
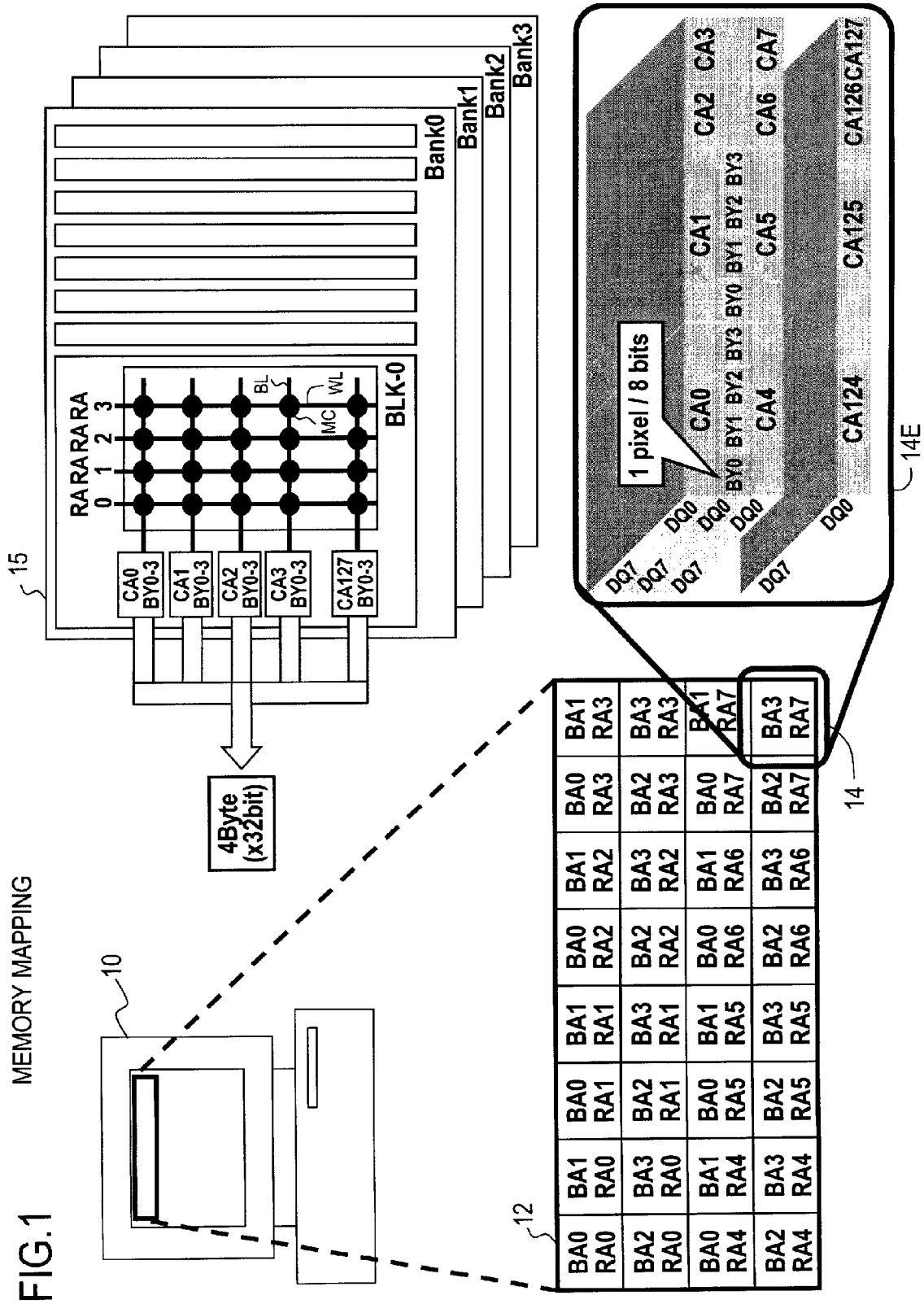
FIG. 1 is a memory mapping of an image memory according to the present embodiment.

FIG. 1 is a memory mapping of an image memory according to the present embodiment. In FIG. 1, an image data in an image processing system having a display device 10 is stored in an image memory 15. The image data is composed of a data of, for example, a luminance signal Y and color-difference signals Cb, Cr of each pixel, or RGB gradation signals of each pixel, wherein each data is composed of, for example, 8 bits (1 byte).

Meanwhile, the image memory 15 is generally configured of a high-capacity and high-speed semiconductor memory device in which an integrated circuit is formed on a semiconductor substrate, such as SDRAM. Such an image memory is composed of a plurality of banks Bank 0-3 (four banks in FIG. 1), wherein each Bank 0 has a plurality of blocks BLK-0, and each block has a plurality of word lines WL, bit lines BL, and memory cells MC disposed at the intersections of the word lines and the bit lines. Each memory cell is composed of a MOS transistor of which gate is connected to a word line, not illustrated, and a capacitor connected to the transistor. In the example shown in FIG. 1, the four banks are related to bank addresses BA0-BA3 respectively, the word lines are related to row addresses RA0-RA7, and the bit lines are related to column addresses CA0-CA127. A word line within a certain bank is selected by the combination of a bank address BA and a row address RA, and a bit line is selected by a column address CA. A data consisting of 4 bytes BY0-3 is accessed by the bank address BA, the row address RA and the column address CA. Since 1 byte consists of 8 bits, 4 bytes i.e. 4×8=32 bits of data are related to the input/output terminals of the memory in one access, so that reading or writing is performed accordingly.

Generally, the bit length of a data unit is 8 bits (1 byte), and in the above example, 4 data units are input and output in one access. By inputting/outputting 4-byte data in one access, it is possible to increase a bandwidth that indicates the number of pixels processable on the image memory per unit time.

According to the memory mapping 12 for the image data, page areas 14, each of which is specified by the bank address BA and the row address RA, are disposed in a matrix form. As shown in an enlarged area 14E, one page area 14 has 128 memory unit areas that are specified by the column addresses CA0-127, and each memory unit area stores a data consisting of 4 bytes BY0-3 (32 bits). The 4 bytes of data, BY0-3, are input/output via a total of 32 memory input/output terminals: DQ0-7, DQ8-15, DQ16-23 and DQ24-31. The above 8-bit data in each byte is associated with a pixel signal data. Further, the 32-bit input/output terminals are connected to a memory data bus.

Namely, the data bus width is 32 bits, which is the same length as the bit length of the memory unit area (4 bytes) selected by the column address CA. Further, in the memory unit area, 4 bytes of data i.e. 4 data units are stored. Additionally, the number of the memory unit areas in each page areas 14 may have an arbitrary number other than the above-mentioned 128.

The above memory map 12 is suitable for operating image memory 15, such as SDRAM constituted of a plurality of banks, at high speed. In response to an active command supplied along with both the bank address BA and the row address RA, the SDRAM performs active operation of: driving a selected word line within a selected bank; reading out a data stored in a memory cell into a bit line; activating a sense amplifier related to the bit line; and amplifying the bit line potential. Thereafter, in response to a read command supplied along with the column address CA, the SDRAM performs read operation to read the data from the selected bit line. Alternatively, after performing the active operation, in response to a write command supplied along with the column address CA and write data, the SDRAM perform write operation to store the write data into the selected bit line. After the read operation or the write operation, precharge operation is performed using a precharge command, and then the active operation and the read or write operation are performed again. In such a manner, in the SDRAM, each bank can perform, independently, the active operation, the read operation and the write operation.

According to memory map 12 shown in FIG. 1, different bank addresses BA0-3 are assigned to page areas 14 located in vertically and horizontally adjacent positions. More specifically, bank addresses BA0, 1 are alternately arranged in the odd-numbered rows of memory map 12, while bank addresses BA2, 3 are alternately arranged in the even-numbered rows. Moreover, each row address RA0-7 is incremented in the raster direction (row direction) of memory map 12, with repetition of every two rows. Also, each row in memory map 12 is folded back to have row addresses RA0-3 or RA4-7.

Figure 2:
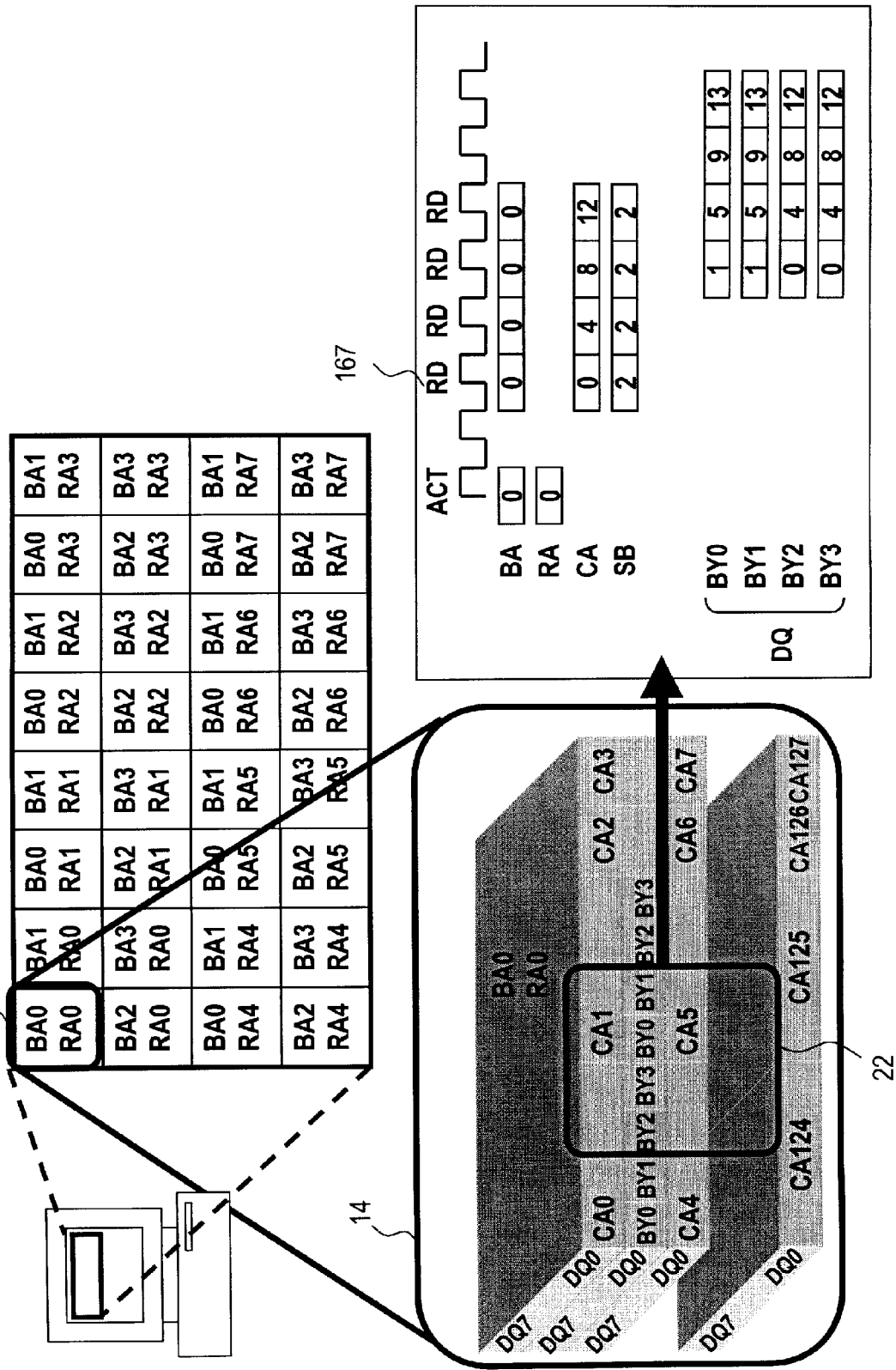
FIG. 2 is a diagram illustrating a byte boundary function of the memory

FIG. 2 is a diagram illustrating a byte boundary function of the memory. In FIG. 2, in order to efficiently access a rectangular area 22 in a page area 14 (BA=0, RA=0), a non-illustrated memory controller issues bank address BA, column address CA and start byte information SB, along with a read command RD. In response thereto, the memory simultaneously outputs 4-byte data BY0-3 stored in rectangular area 22 to the input/output terminal DQ. Similar operation is performed in the case of a write command WT.

In response to bank address BA=0, row address RA and active command ACT, the memory sets page area 14 to an active state. Then, in response to a column address CA=0 and start byte information SB=2 supplied along with the first read command RD, the memory outputs byte data BY2, 3 in memory unit area CA=0 and byte data BY0, 1 in memory unit area CA=1 among the data in the adjacent memory unit areas of the column addresses CA=0 and 1, to the input/output terminal DQ as byte data BY0-4. In response to a column address CA=4 and start byte information SB=2 supplied along with a next read command RD, the memory outputs, to the input/output terminal DQ, byte data BY2, 3 in memory unit area CA=4 and byte data BY0, 1 in memory unit area CA=5, among the data in the adjacent memory unit areas of the column addresses CA=4, 5, as byte data BY0-4. Also, in regard to subsequent two read commands RD issued thereafter, similarly, the memory selects 4 bytes of data in combination according to the start byte information SB=2, from the adjacent memory unit areas, and outputs them to the input/output terminal DQ.

As such, according to the byte boundary function, in response to an access by one read command, the memory selects 4 bytes (4 data units) of data of arbitrary combination from adjacent memory unit areas, and can output them to the 32-bit input/output terminal DQ. Also, in the case of writing, in response to an access by one write command, the memory selects 4 bytes (4 data units) of area of arbitrary combination from adjacent memory unit areas, and can write a write data, according to the byte boundary function

[Image Data Memory Map and Access Efficiency]

Next, by showing a plurality of memory maps of pixel data constituting image data, description will be given to access efficiency of each case. As a prerequisite, the bit length of pixel data is 10 bits (N=10), the bit length of memory data unit is 8 bits (1 byte) (K=8), and a memory unit area Munit (14 in FIGS. 1, 2) selectable by a supplied address has 4 bytes i.e. 4 data units, so that 4×8=32 bits of data are stored.

Figure 3A:
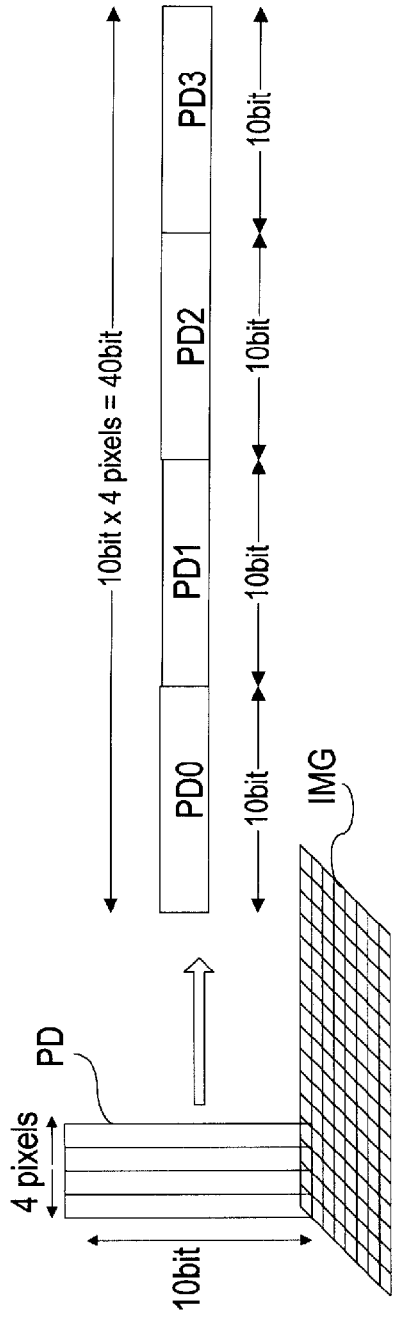
FIG. 3 is a diagram illustrating first memory mapping of pixel data.

FIG. 3 is a diagram illustrating first memory mapping of pixel data. As shown in FIG. 3A, an image IMG is composed of a plurality of pixels that are arranged two-dimensionally. Each PD (pixel data) has a bit length of 10 bits. By raster scanning the above image IMG, it is possible to successively extract pixel data PD0, PD1, PD2, PD3, PD4, . . . , each consisting of 10 bits. An upper-level processor writes into the memory, or reads out from the memory, such the pixel data PD0-PD4, via the memory controller.

Figure 3B:
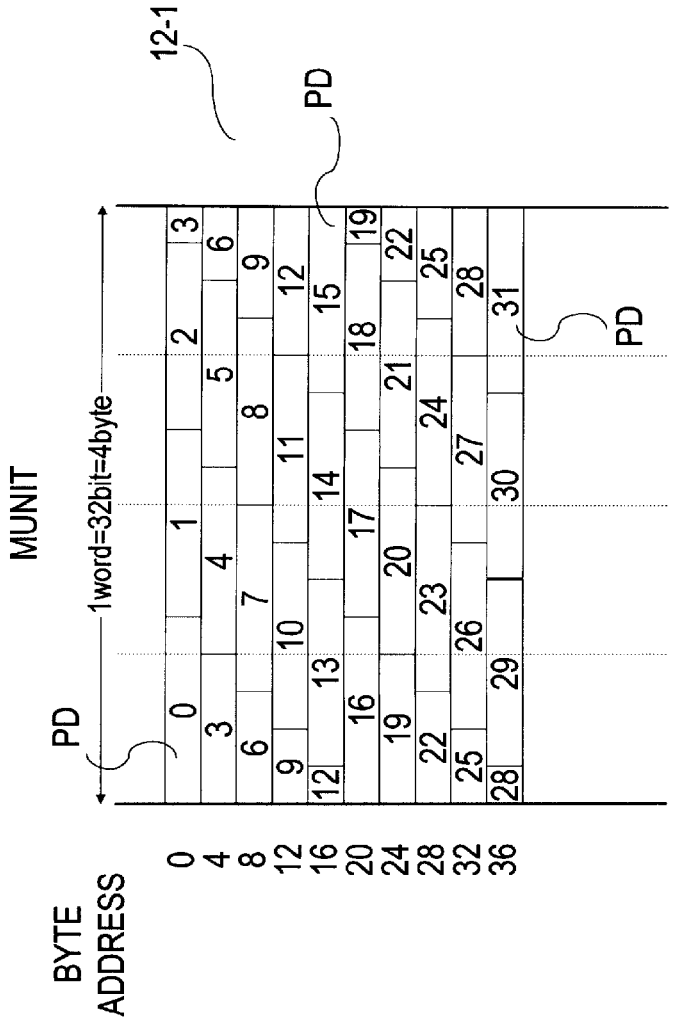

According to a memory map 12-1 shown in FIG. 3B, pixel data PD0-PD31, each consisting of 10 bits, are consecutively arranged in the 4-byte memory unit areas Munit. In memory map 12-1, the memory unit areas Munit are arranged one-dimensionally in the vertical direction. In other words, the memory unit areas arranged two-dimensionally in FIGS. 1, 2 are arranged one-dimensionally. Further, on the left side of memory map 12-1, byte addresses 0, 4, 8, 12, . . . are shown. Each of the above byte addresses is given to 4 byte areas (data units) of each memory unit area Munit, which is different from the column address CA given to the memory. The memory unit areas corresponding to the column addresses CA0, CA1, CA2 and CA3 respectively include 4 byte areas (data units), as shown in page area 14 of FIGS. 1, 2. Accordingly, the byte addresses 0, 4, 8, 12, . . . shown in FIG. 3B correspond to the column addresses CA0, CA1, CA2, CA3, . . . , respectively.

In memory map 12-1, 10-bit pixel data PD0-PD31 are consecutively arranged in the memory unit areas Munit each consisting of 4 bytes. Accordingly, the pixel data PD0 is stored in 2 byte areas by the separation into 8 bits and 2 bits, the pixel data PD1 is stored in 2 byte areas by the separation into 6 bits and 4 bits, the pixel data PD2 is stored in 2 byte areas by the separation into 4 bits and 6 bits, and the pixel data PD3 is stored in 2 byte areas, and also in 2 memory unit areas Munit, by the separation into 2 bits/8 bits. Similarly, each of pixel data PD6, 9 and 12 is stored across words of 2 memory unit areas Munit by the separation into 4/6 bits, 6/4 bits and 8/2 bits, respectively. Thus, pixel data PD0-15 for 16 pixels (10 bits×16 pixels=160 bits) are stored in 5 memory unit areas Munit (5 word areas). The pixel data for 16 pixels are stored in 5 memory unit areas Munit, and in a repeated manner.

FIG. 4 is a diagram illustrating access efficiency in the first memory mapping shown in FIG. 3. FIG. 4A shows byte addresses when reading 10-bit pixel data for 8 pixels, by shifting the readout start position, one pixel by one, with the start from PD0. Corresponding to the respective readout start pixel positions, the byte addresses to be accessed are shown. As described earlier, the byte addresses are supplied only by addresses "0, 4, 8, 12" corresponding to the column addresses CA. Similarly, FIG. 4B shows byte addresses when 8-bit pixel data are to be read out.

In the case of 10-bit access shown in FIG. 4A, when reading out data for 8 pixels, PD0-PD7, with the start from the pixel data PD0, it is necessary to read out by 3 byte addresses "0, 4, 8". It is also the same when reading out 8 pixel data with the start from the pixel data PD1. Further, when reading out data for 8 pixels, PD2-PD9, with the start from the pixel data PD2, it is necessary to read out by 4 byte addresses "0, 4, 8, 12". This is also the same when reading out 8 pixel data with the start from the pixel data PD3.

In the case of 8-bit access shown in FIG. 4B, it is necessary to perform readout by the same byte addresses as is applied to the case of 10-bit access shown in FIG. 4A. As such, according to the first memory mapping 12-1, it is necessary to perform the 8-bit access in a similar manner to the 10-bit access, and therefore it is not possible to perform 8-bit access efficiently.

FIG. 5 is a diagram illustrating second memory mapping of pixel data. As shown in FIG. 5A, each pixel data PD has a bit length of 10 bits. By raster scanning an image, it is possible to extract 10-bit pixel data PD0, PD1, PD2, PD3, PD4, . . . successively. Each pixel data PD0-PD4 is separated into upper 8 bits and lower 2 bits, and the upper 8 bits are stored into a Memory 1 and the lower 2 bits are stored into a Memory 2, respectively in a separate manner.

According to a memory map 12-2 shown in FIG. 5B, upper 8 bit data of the pixel data PD0-PD39 are consecutively stored into each byte area of the memory unit areas Munit in Memory 1, while lower 2 bit data are consecutively stored into the Memory 2. In Memory 1, the upper 8-bit data for 4 pixels are stored in one memory unit area Munit. In Memory 2, lower 2-bit data for 16 pixels (16×2=32 bits) are stored into one memory unit area Munit.

FIG. 6 is a diagram illustrating access efficiency in the second memory mapping shown in FIG. 5. FIG. 6(A) shows byte addresses when reading out 10-bit pixel data for 8 pixels by shifting the readout start position, one pixel by one, with the start from PD0.

In the case of 10-bit access shown in FIG. 6A, when reading out 8 pixel data PD0-PD7 starting from the pixel data PD0, it is necessary to read out 2 addresses "0, 4" of Memory 1 and an address "0" of Memory 2. Also, when reading out 8 pixel data PD2-PD9 starting from the pixel data PD2, it is necessary to read out 3 addresses "0, 4, 8" of Memory 1 and also the address "0" of Memory 2. It is the same when reading out 8 pixel data starting from the pixel data PD1, PD3. The thick frames shown in FIG. 6A show the byte addresses of Memory 2.

In the case of 8-bit access shown in FIG. 6B, the readout of Memory 2 becomes unnecessary, and therefore, it is unnecessary to access by the addresses of Memory 2 shown by the thick frames in FIG. 6A.

According to the second memory map 12-2, it is possible to reduce the number of access times in the cases of both the 10-bit access and the 8-bit access. However, mounting cost increases because of the use of two memory chips. In other words, the use of two memory chips should be avoided from the viewpoint of a mounting area.

[Memory Map According to the Present Embodiments]

FIG. 7 is a diagram illustrating memory mapping according to the present embodiments. FIG. 7(a) shows a third memory map 12-3, and FIG. 7(b) shows a fourth memory map 12-4, respectively. In each figure, pixel data PD0-15 and PD16-31 for horizontal 16 pixels located mutually adjacently are made to be one unit (10 bits×16=160 bits), and pixel data are allocated to 5 memory unit areas Munit (=word areas Word) in a repeated manner.

According to the third memory map 12-3 shown in FIG. 7(a), pixel data PD0-PD15 for 16 pixels are separated into upper 8 bits and lower 2 bits, respectively. Among 5 words, upper 8-bit data of 16 pixel data PD0-PD15 are allocated to the first 4 words, while lower 2-bit data of the 16 pixel data are allocated to the last 1 word in a packed manner. Accordingly, the upper 8-bit data of the 16 pixel data PD0-PD15 and the packed lower 2-bit data are allocated to the memory unit areas Munit, in an alternate and consecutive manner.

According to the fourth memory map 12-4 shown in FIG. 7(b), among 5 words, upper 8-bit data of 8 pixel data PD0-PD7 are allocated to the first 2 words, and lower 2-bit data of 16 pixel data PD0-PD15 are allocated to the next 1 word, and further, upper 8-bit data of 8 pixel data PD8-PD15 are allocated to the subsequent 2 words, respectively. Namely, among 16 pixel data PD0-PD15, the lower 2-bit data of 16 pixel data are allocated in a sandwiched manner between the upper 8-bit data of 8 pixel data, and in a repeated manner.

The third and fourth memory mapping shown in FIG. 7 is a first preferred embodiment. According to the above memory mapping, a memory controller stores data consisting of N bits (N=10) into a memory that has a data unit of 8 bits (1 byte). The memory controller divides each N-bit data into 8 bits and N−8 (10−8=2) bits. In regard to L pieces of data (L=16), the memory controller stores 8-bit data having L in number into the memory on the basis of data units having L in number, and stores packed (N−8)-bit data having L in number into the memory, on the basis of data units having M in number (where M=L×(N−8)/8=16×(10−8)/8=4). Then, the bit length of L 8-bit data (i.e. 8×L bits=128 bits) becomes a multiple (four-fold, 32×4=128 bits) of the bit length (32 bits) of the memory unit area. Also, the bit length of the packed L (N−8)-bit data (i.e. (N−8)×L bits=32 bits) becomes a multiple (one-fold) of the bit length (32 bits) of the memory unit area.

FIG. 8 is a diagram illustrating access efficiency according to the third memory map 12-3 shown in FIG. 7(a). Similar to the foregoing description, for the third memory map 12-3, shown are byte addresses to be accessed in the respective cases when reading out 8 pixel data by shifting the horizontal readout start position one pixel by one. FIG. 8A shows a case of reading out 10-bit data, while FIG. 8B shows a case of reading out upper 8-bit data.

In the 10-bit data access shown in FIG. 8A, in case of reading out 8 pixel data PD0-PD7 with the start from the pixel data PD0, the byte addresses to be accessed are three addresses, namely addresses "0, 4" in which the upper 8-bit data are stored, and an address "16" in which the lower 2-bit data are stored. In case of reading out 8 pixel data PD2-PD9 from the pixel data PD2, the byte addresses to be accessed are four addresses, namely, addresses "0, 4, 8" in which the upper 8-bit data are stored, and an address "16" in which the lower 2-bit data are stored. The above is also applicable to subsequent cases.

In the case of reading out 8-bit data, access to the lower 2-bit data becomes unnecessary. Therefore, the lower 2-bit data access shown by the thick frames in FIG. 8A is excluded, and the access becomes as shown in FIG. 8B. In the third memory map 12-3, although data are stored in only one memory, however, the number of access times is equivalent to the case of the second memory map 12-2 shown in FIG. 6. Thus, the reduction of mounting cost is achieved while the memory access efficiency is maintained.

FIG. 9 is a diagram illustrating access efficiency according to the fourth memory map 12-4 shown in FIG. 7(b). According to the fourth memory map 12-4, one-word data having lower 2-bit data packed therein is mapped to the center of the upper 8-bit data for 4 words. Accordingly, in the 10-bit data access shown in FIG. 9A, the access position of the lower 2-bit data shown by the thick frames is different from the position shown in FIG. 8. Other points are the same as FIG. 8. Therefore, in the third and fourth memory maps, the access efficiency is mutually equivalent.

In the third and fourth memory maps 12-3, 12-4, mapping is made in such a manner that both upper 8-bit data for 16 pixels and lower 2-bit data for 16 pixels come to have multiples of the bit length of the memory unit area Munit, namely, multiples of the bit length (32 bits) of the word area Word. Therefore, when accessing 10-bit data, it is possible to perform data readout and writing without a waste, by accessing the memory unit area Munit for a plurality number of times. By this, it is possible to achieve higher memory access efficiency.

Further, in the third and fourth memory maps 12-3, 12-4, each of the 8-bit data and the packed 2-bit data is mapped to form a multiple of the bit length of the memory unit area. Therefore, it is advantageous when, in response to one access to the memory, the memory inputs and outputs data of the memory unit area, consisting of 4 bytes i.e. 32 bits, that is selectable by the column address CA.

Next, explanation will be given to memory mapping that is advantageous when the memory has the byte boundary function and 4-byte i.e. 32-bit data can be input/output from a memory unit (byte area) in an arbitrary position of the memory unit area by one access.

Figure 10:
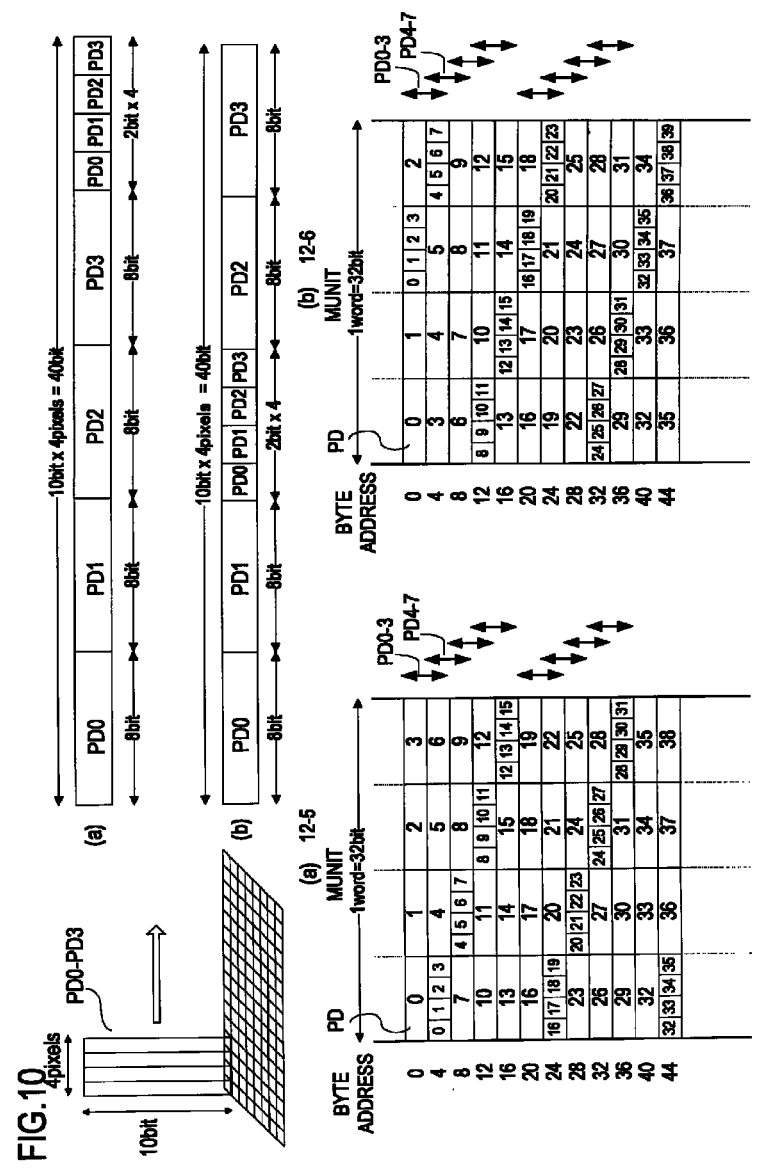

FIG. 10 is a diagram illustrating memory mapping according to the present embodiment. A fifth memory map 12-5 is shown in FIG. 10(a), and a sixth memory map 12-6 is shown in FIG. 10(b), respectively. In both figures, by the formation of pixel data PD0-3, PD4-7 of horizontally adjacent 4 pixels, as one unit (10 bits×4=40 bits), is allocated to 5 byte areas repeatedly.

According to the fifth memory map 12-5 shown in FIG. 10(a), among consecutive 5 bytes, upper 8-bit data of 4 pixel data PD0-PD3 are allocated to the first 4 bytes, and lower 2-bit data of the 4 pixel data PD0-PD3 are allocated to the last 1 byte. Such allocation is also made for the next 4 pixel data PD4-PD7, PD8-PD11. Namely, 4 bytes of the upper 8-bit data and 1 byte packed lower 2-bit data are allocated to memory byte areas in an alternate and consecutive manner.

According to the sixth memory map 12-6 shown in FIG. 10(b), among consecutive 5 bytes, upper 8-bit data of 2 pixel data PD0, PD1 on the left side are allocated to the first 2 bytes, and packed lower 2-bit data of 4 pixel data PD0-PD3 are allocated to the next 1 byte, and further, upper 8-bit data of 2 pixel data PD2, PD3 on the right side are allocated to the subsequent 2 bytes. Such allocation is also applied to the next 4 pixel data PD4-PD7, PD8-PD11. Namely, in the center of the 4 bytes of the upper 8-bit data, the lower 2-bit data packed into 1 byte are allocated.

In either memory map shown in FIG. 10(a), (b), 4 pixel data are allocated to the memory on the basis of 5 bytes as 1 unit. Accordingly, in the memory unit area Munit (word area Word), each byte position to which the lower 2-bit data are allocated is shifted one byte by one, and returns to the original position after 5 word areas Word.

The fifth and sixth memory mapping shown in FIG. 10 is a second preferred embodiment. According to the above memory mapping, a memory controller stores N-bit data (N=10) into a memory that has a data unit of 8 bits (1 byte). The memory controller divides each N-bit data into 8 bits and N−8 (1031 8=2) bits. In regard to L pieces of data (L=4), the memory controller stores L 8-bit data into the memory on the basis of L data units, and stores packed (N−8)-bit data, having L in number, into the memory, on the basis of M data units (where M=L×(N−8)/8=4×(10−8)/8=1). Then, the bit length of L 8-bit data (i.e. 8×L bits=32 bits) becomes a multiple (=one-fold) of the bit length (32 bits) of the memory unit area. Also, M equals 1.

FIG. 11 is a diagram illustrating access efficiency according to the fifth memory map 12-5 shown in FIG. 10(a). Similar to the foregoing description, for the fifth memory map 12-5, shown are byte addresses when reading out 8 pixel data by shifting the horizontal readout start position one pixel by one. FIG. 11A shows a case of reading out 10-bit data, while FIG. 11B shows a case of reading out upper 8-bit data.

Here, a point to be noted is that there is a prerequisite of a memory capable of byte boundary access as described in FIG. 2. According to the byte boundary access, by supplying the start byte information SB in addition to the column address CA, the memory can input and output a 1-word data, having the bit length of the memory unit area, from an arbitrary byte area in the memory unit area Munit. In other words, by the combination of the column address CA and the start byte information SB, it is possible to specify a readout start byte address. Accordingly, in FIG. 11, the byte addresses to be accessed are not "0, 4, 8, 12, . . . ", but arbitrary byte addresses, such as "1, 5, 9, 13".

In the 10-bit data access shown in FIG. 11A, in case of reading out 8 pixel data PD0-PD7 starting from the pixel data PD0, the byte addresses are three addresses i.e. "0, 4, 8". Incase of reading out 8 pixel data PD1-PD8 starting from the pixel data PD1, the byte addresses are four addresses "1, 5, 9, 13". To specify the above byte addresses, the column addresses CA "0, 4, 8, 12" and the start byte SB=1 are specified. In response to the byte address "1", 8-bit data of PD1-PD3 and 2-bit data of PD0-PD3 are read out. To the byte address "5", 8-bit data of PD4-PD7 are readout, and to the byte address "9", 2-bit data of PD4-PD7 and 8-bit data of PD8-PD11 are read out, and to the byte address "13", 8-bit data of PD11, 2-bit data of PD8-PD11 and 8-bit data of PD12, PD13 are read out. In case of reading out 8 pixel data starting from the pixel data PD2, the byte addresses are 4 addresses, i.e. "2, 6, 10, 14". To specify such the byte addresses, the column addresses CA "0, 4, 8, 12" and the start byte SB=2 are specified. Similarly, in case of reading out 8 pixel data PD3-PD10 starting from the pixel data PD3, the byte addresses are "3, 7, 11". It may be understood for other cases to follow in a similar way.

On the other hand, in the 8-bit data access shown in FIG. 11B, it is not necessary to read out the byte area of the packed lower 2-bit data. Therefore, the byte addresses become addresses for reading out consecutive 4 bytes having upper 8-bit data. For example, when reading out 8 pixel data PD0-PD7 starting from the pixel PD0, the byte addresses are only 2 addresses "0, 5". However, when the readout start position is not a multiple of 4, it is necessary to read out 3 words. For example, in case of reading out 8 pixel data PD2-PD9 starting from the pixel data PD2, the byte addresses become 3 addresses "0, 5, 10". In other words, in the case of 8-bit access, if the readout start position is restricted to a multiple of 4, it is possible to read out by the access to 2 addresses without a waste.

FIG. 12 is a diagram illustrating access efficiency according to the sixth memory map 12-6 shown in FIG. 10B. Similar to the foregoing description, for the sixth memory map 12-6, shown are byte addresses when reading out 8 pixel data by shifting the horizontal readout start position one pixel by one. FIG. 12A shows a case of reading out 10-bit data, while FIG. 12B shows a case of reading out upper 8-bit data.

In the 10-bit data access shown in FIG. 12A, in case of reading out 8 pixel data PD0-PD7 starting from the pixel data PD0, the byte addresses are three addresses "0, 4, 8". In case of reading out 8 pixel data PD2-PD9 starting from the pixel data PD2, the byte addresses are three addresses "2, 6, 10". In this case, the column addresses CA are CA0, 1, 2, and the start byte is SB=2. Similarly, in the subsequent cases also, 10-bit data for 8 pixels can entirely be read out by 3 accesses. The reason is that, among 4 pixel data, because packed 2-bit data for 4 pixels are mapped between 8-bit data for the 2 pixels on the left and right (or in the center of 8-bit data for 4 pixels), it is not necessary to access 4 times as required in the fifth memory map 12-5. Thus, according to the sixth memory map, in the case of 10-bit access, highest access efficiency is obtained as compared to the foregoing first to the fifth memory maps.

In the case of 8-bit data access shown in FIG. 12B, it is not necessary to read out byte areas of the packed lower 2-bit data, and accordingly, readout can be performed by 3 accesses or 2 accesses. The access efficiency thereof is equivalent to the fifth memory map shown in FIG. 11B. Further, by restricting the readout start position to 4n+2 (n=0, 1, 2, . . . ), the readout start positions become PD2, 6, 10, 14. Then, the access can entirely be made by 2 addresses, and high access efficiency can be attained similarly to FIG. 11B.

Figure 13:
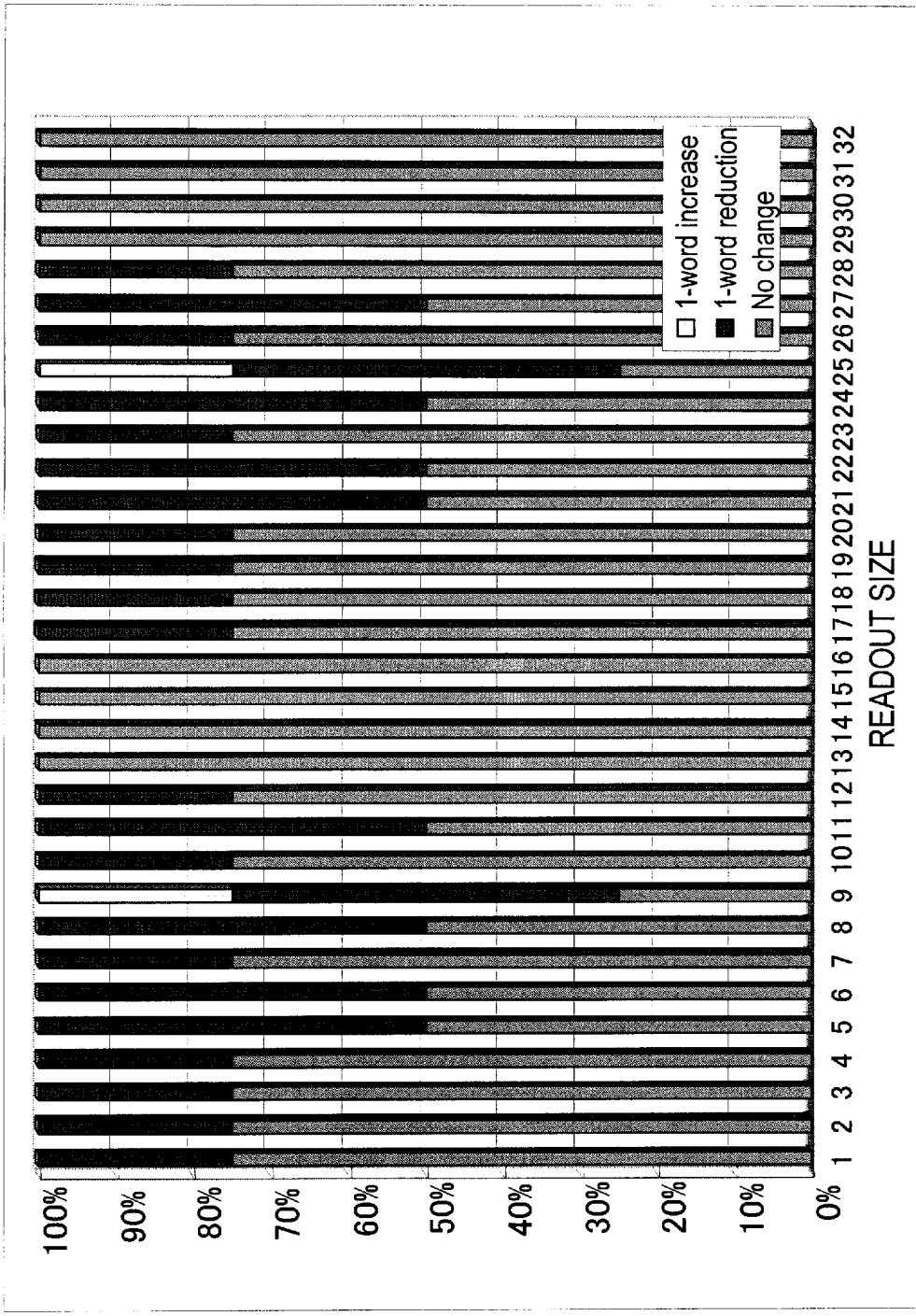
FIG. 13 is a diagram illustrating the comparison of access efficiency under different readout sizes in regard to the fifth and sixth memory maps.

FIG. 13 is a diagram illustrating the comparison of access efficiency under different readout sizes in regard to the fifth and sixth memory maps. The comparison is made on the case of the 10-bit access. The horizontal axis shows 32 kinds of readout sizes (1 pixel through 32 pixels). On the other hand, the vertical axis shows the comparison of the number of access times between the fifth memory map and the sixth memory map, in regard to the 32 kinds of pixel start positions under each readout size 1-32. Specifically, there are shown the ratios of 1-word increase, 1-word reduction and no change in the sixth memory map as compared to the fifth memory map.

According to the above experiment result, among 32 kinds of readout sizes×32 kinds of pixel start positions, namely among 32×32=1024 patterns, 1-word reduction occurs in 262 patterns, and 1-word increase occurs in 16 patterns. Accordingly, in the 10-bit access, it is shown that, in the sixth memory map 12-6, the number of access times (number of words) can be reduced to a greater degree than in the fifth memory map 12-5. In the case of 8-bit access, the number of access times are equivalent, as described earlier.

FIG. 14 is a diagram illustrating access efficiency when the byte boundary access is used in the first memory map. In this case also, there are shown byre addresses accessed when reading out 8 pixel data from start pixels PD0-PD15. Three (3) accesses are required in both cases of the 10-bit access shown in FIG. 14A and the 8-bit access shown in FIG. 14B. In other words, in the 8-bit access, the access efficiency is decreased as compared to the sixth memory map 12-6.

FIG. 15 is a diagram illustrating access efficiency when the byte boundary access is used in the second memory map. In this case also, there are shown byre addresses accessed when reading out 8 pixel data from the start pixels PD0-PD15. In the 10-bit access shown in FIG. 15A, 3 accesses are required in all cases, while in the 8-bit access shown in FIG. 15B, there comes to be 2 accesses in all cases. The highest access efficiency is obtained. However, since the second memory map uses 2 memories, it brings about the increase of both cost and area, which is not desirable.

According to the fourth memory map 12-4 shown in FIG. 7(*b*), the bit length ((N−8)×L) of packed lower (N−8)-bit data for L pixels is a multiple (one-fold) of the bit length (32 bits) of the memory unit area Munit. Therefore, when accessing 8-bit data, it is possible to access by skipping the memory unit area of fractional (N−8)-bit data, which brings about increased access efficiency.

Figures 16A, 16B, 16C:
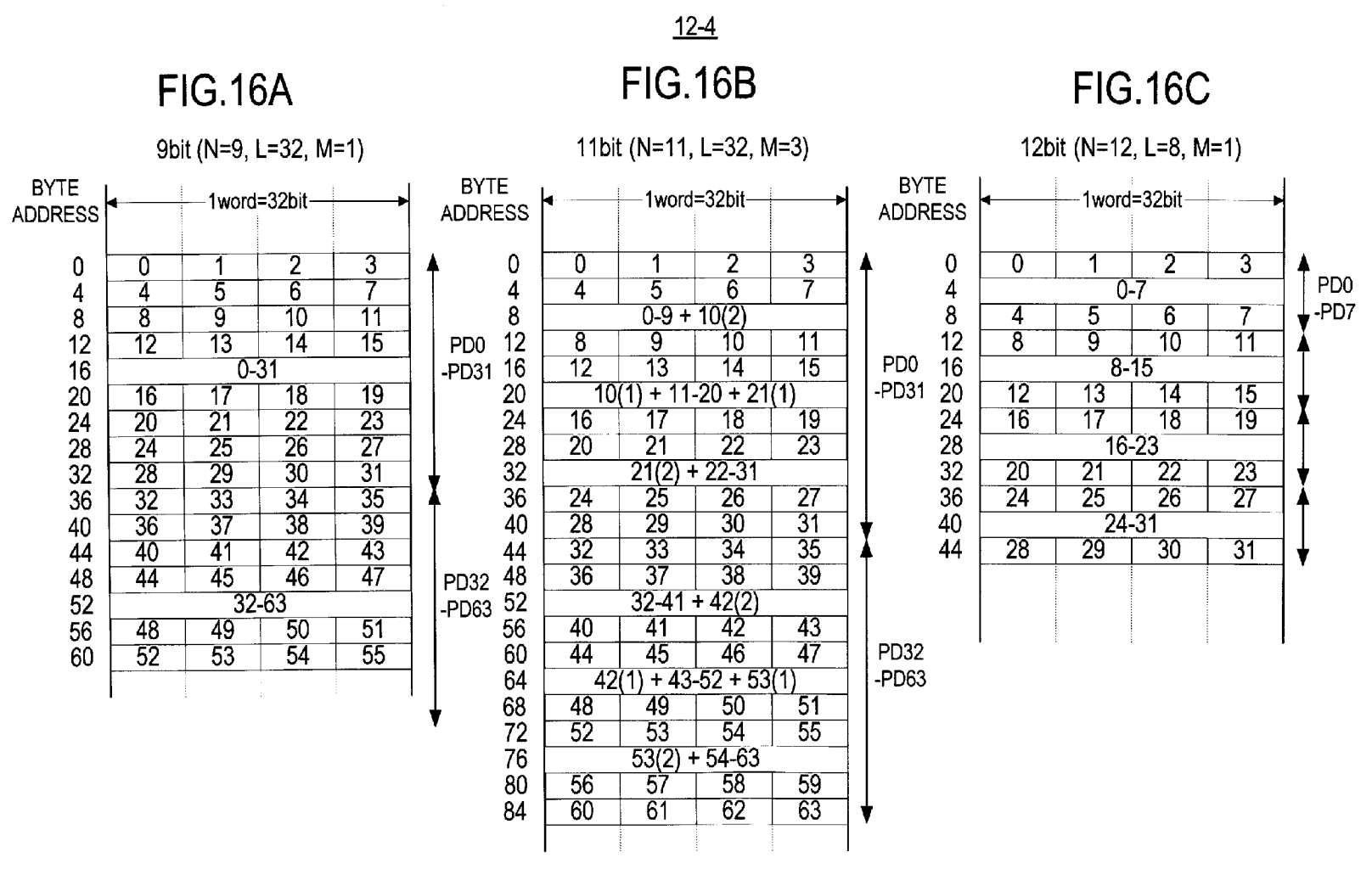

FIG. 16 is exemplary variations of the fourth memory map. The examples of : FIG. 16A N=9 bits, L=32 pixels and M=1 word; FIG. 16B N=11 bits, L=32 pixels and M=3 words; and FIG. 16C N=12 bits, L=8 pixels and M=1 word are shown. In either case, upper 8-bit data length for L pixels constitutes a multiple of the data length (32 bits) of the memory unit area, and also, lower (N−8)-bit data length for L pixels constitutes a multiple of the data length (32 bits) of the memory unit area.

In the example FIG. 16A, packed lower 1-bit data for 32 pixels are arranged into one memory unit area (1 word), at the central position of the upper 8-bit data for 32 pixels.

In the example FIG. 16B, packed lower 3-bit data for 32 pixels are arranged into 3 memory unit areas (3 words), and arranged in among the upper 8-bit data for 32 pixels in a distributed manner.

In the example FIG. 16C, packed lower 4-bit data for 32 pixels are arranged into 1 memory unit area (1 word) to the central position of the upper 8-bit data for 32 pixels.

According to the sixth memory map 12-6 shown in FIG. 10(*b*), the bit length ((N−8)×L) of packed lower (N−8)-bit data for L pixels is a multiple (one-fold) of the data unit bit length (8 bits). Therefore, when accessing 8-bit data, it is possible to access by skipping the data unit area (byte area) of fractional (N−8)-bit data due to the byte boundary access, which brings about increased access efficiency. Moreover, the bit length (8×L) of the upper 8-bit data for L pixels is a multiple (one-fold) of the bit length i.e. the data bus width (32 bits) of the memory unit area. Therefore, when accessing 8-bit data, it is possible to minimize the number of access times. Also, by arranging packed lower (N−1)-bit data between 8-bit data for L/2 pixels, it is possible to increase the access efficiency in the 10-bit access, as shown in FIG. 13.

FIG. 17 is exemplary variations of the sixth memory map. The examples of: FIG. 17A N=9 bits, L=8 pixels and M=1 byte; FIG. 17B N=11 bits, L=8 pixels and M=3 bytes; and FIG. 17C N=12 bits, L=4 pixels and M=2 bytes are shown. In either case, upper 8-bit data length for L pixels constitutes a multiple of the byte area data length (8 bits) i.e. data unit, and also, lower (N−8)-bit data length for L pixels constitutes a multiple of the byte area data length (8 bits) i.e. data unit.

In the example FIG. 17A, packed lower 1-bit data for 8 pixels are arranged into one byte to the central position of the upper 8-bit data for 8 pixels (for example, PD0-7).

In the example FIG. 17B, packed lower 3-bit data for 8 pixels are arranged into 3 bytes to the central position of the upper 8-bit data for 8 pixels (for example, PD0-7).

In the example FIG. 17C, packed lower 4-bit data for 4 pixels are arranged into 4 bytes to the central position of the upper 8-bit data for 4 pixels (for example, PD0-3).

[Memory Controller and Memory System According to the Present Embodiment]

Among the aforementioned memory maps, by taking the sixth memory map 12-6 as an example, a memory controller and a memory system will be described. Memory map 12-6 is the same as that shown in FIG. 10(*b*). According thereto, in regard to the 10-bit pixel data, the 8-bit data for 4 pixels are allocated to the 4-byte area, and the packed 2-bit data for 4 pixels are allocated to the 1-byte area, respectively. Further, the packed 2-bit data are allocated at the center of the 8-bit data in the 4-byte area.

Further, SDRAM is used as the memory. This memory includes a plurality of banks, for example, 4 banks. A page area selected by a row address RA consists of 2 K (=2048) bytes, and a word area (memory unit area Munit) selected by a column address CA consists of 4 bytes (=32 bits). Thus, the page area having 2 K bytes includes 512 word areas.

FIG. 18 is a memory system configuration according to the present embodiment. The memory system includes: a memory controller 80 having an access request REQ supplied from an upper-level image processor, for generating a command COM and an address ADD corresponding to the access request; and a memory chip 86 which is access controlled by the memory controller. Write data or readout data DQ are input/output between memory controller 80 and memory 86.

Memory controller 80 includes: an arbiter unit 81 for arbitrating access requests REQ from the upper-level processor; a coordinate converter unit 82 for converting the coordinates (X,Y) of an image in an access target area, which are included in the parameters of the received access request REQ, into an address (X',Y) in the memory according to the memory map; an access controller 83 for generating an address ADD and a command COM corresponding to the access requests REQ; and based on the memory map, a data mapping unit 84 for arranging 10-bit pixel data PD to data units (byte data) in the memory, and inversely, rearranging data of data units (byte data) output from the memory to 10-bit or 8-bit pixel data.

Memory chip 86 includes: four memory banks 92 each having a memory array MA and an input/output circuit 93; a row controller 87 for controlling row addresses; a refresh controller 89; and a column controller 90 for controlling column addresses. Column controller 90 includes a byte boundary controller 91 for controlling byte boundary. Memory chip 86 is configured of a general-purpose SDRAM, except for byte boundary controller 91.

Additionally, in regard to the byte boundary function, it is described in detail in the specification of the Japanese Patent Application No. 2006-345415, for example. The disclosed content of the Japanese Patent Application No. 2006-345415 is incorporated into the present specification.

Figure 19:
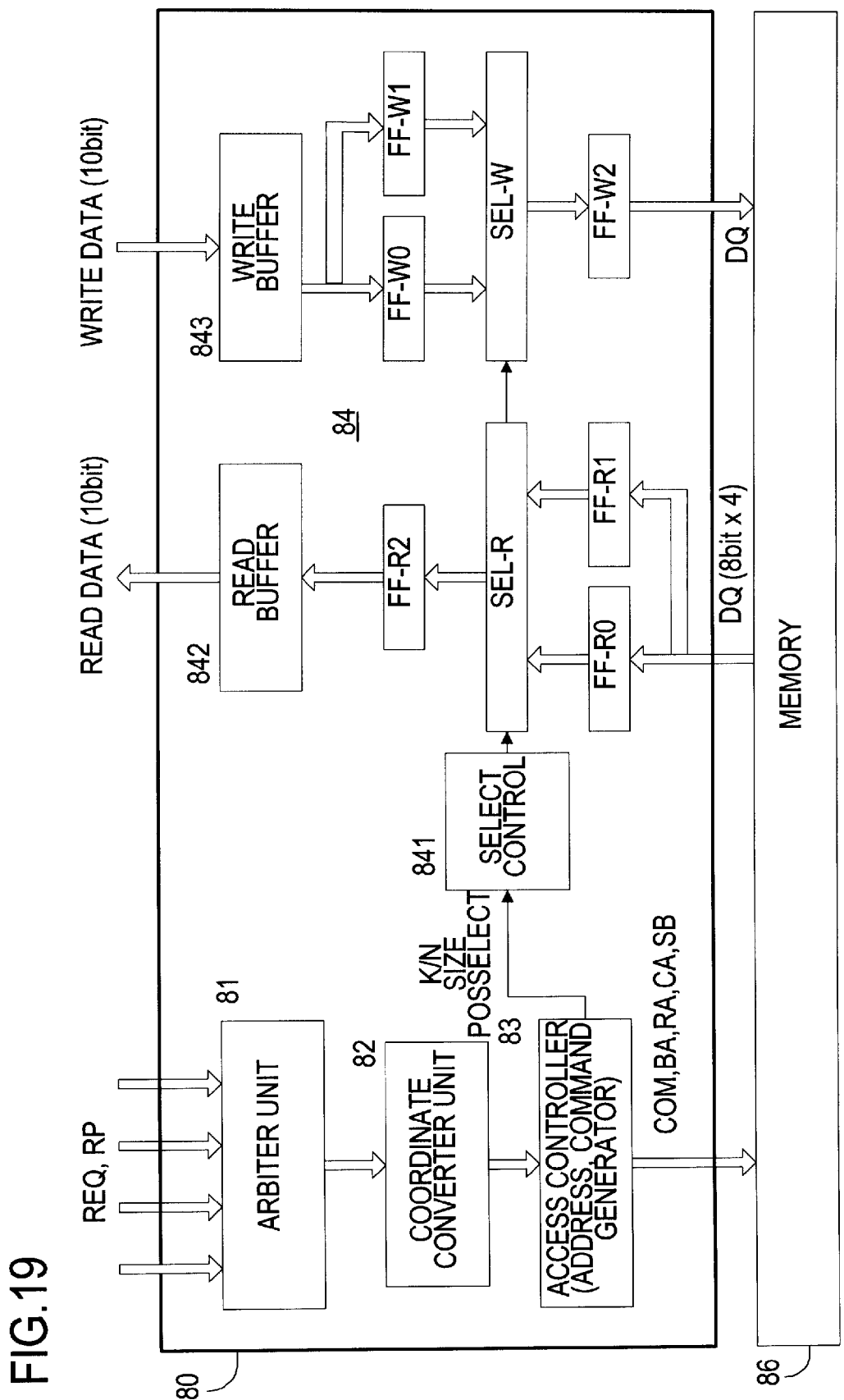
FIG. 19 is a configuration diagram of memory controller 80 according to the present embodiment.

FIG. 19 is a configuration diagram of memory controller 80 according to the present embodiment. As shown in FIG. 18, memory controller 80 includes arbiter unit 81 for inputting access requests REQ along with request parameters RP, a coordinate converter unit 82, an access controller 83, and a data mapping unit 84. The configuration of data mapping unit 84 will be described later.

Figure 20:
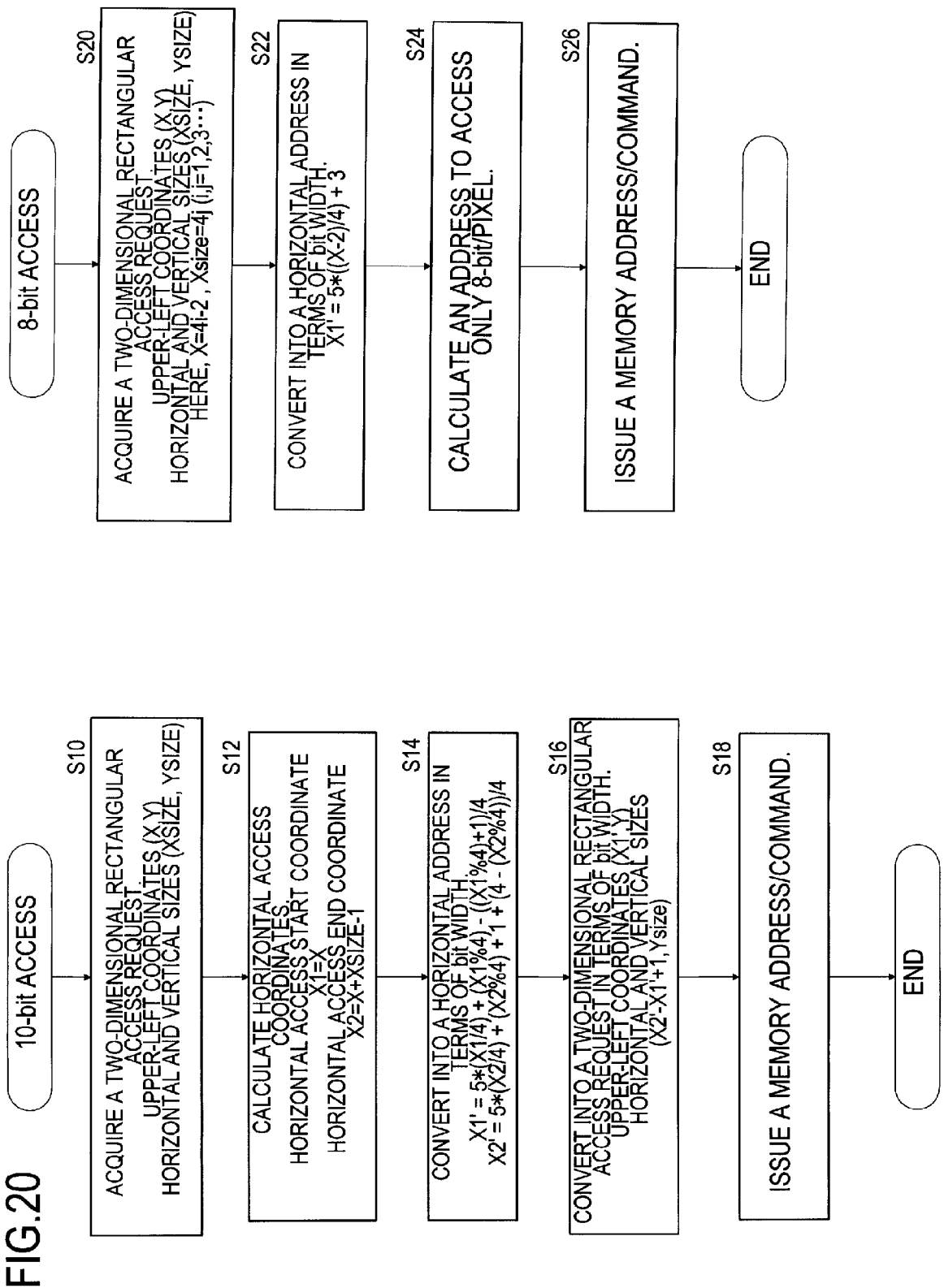
FIG. 20 is a flowchart illustrating processing performed in the coordinate converter unit and the access controller of the memory controller.

FIG. 20 is flowcharts illustrating processing performed in the coordinate converter unit and the access controller of the memory controller. In FIG. 20, the cases of 10-bit access and 8-bit access are described. Hereafter, by taking the 10-bit access as an example, the memory controller operation will be described.

On acquiring a two-dimensional rectangular access request REQ, the memory controller acquires, as request parameters, upper-left coordinates (X,Y) and horizontal and vertical sizes (Xsize, Ysize) of a rectangular area in a frame image (S10). From the above request parameters, coordinate converter unit 82 performs coordinate conversion into a two-dimensional address (X',Y) in the memory (S12, S14, S16). Further, access controller 83 generates memory addresses and commands (S18). Additionally, by the rectangular access requests REQ, it is possible to distinguish between 10-bit access and 8-bit access.

Figure 21:
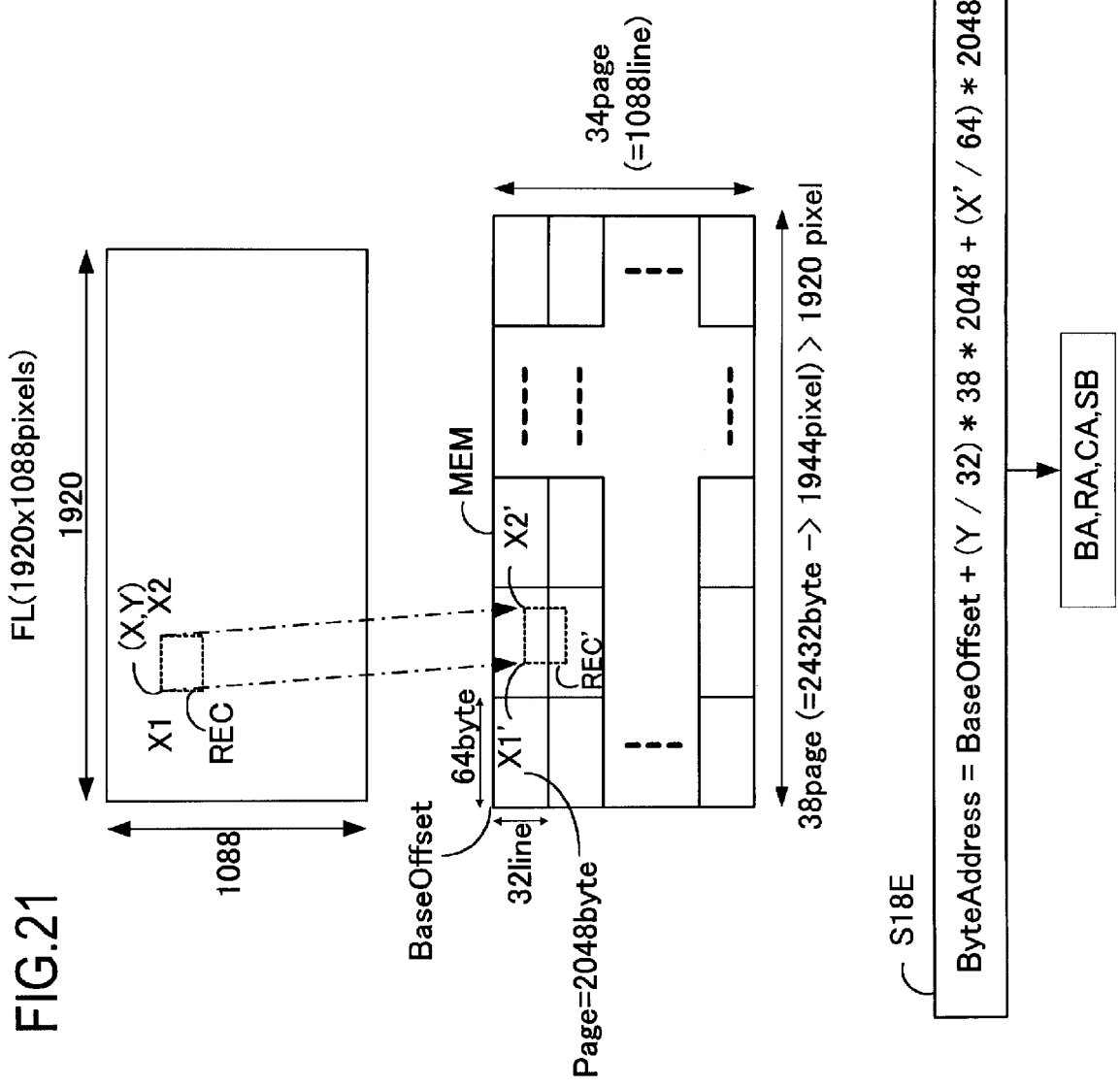
FIG. 21 is a diagram illustrating the relationship between a frame image and a two-dimensional memory address.

FIG. 21 is a diagram illustrating the relationship between a frame image and a two-dimensional memory address. In the figure, a frame image FL is composed of 1920×1088 pixels, and a memory MEM is composed of 38 pages×34 pages. Each page area Page is composed of 64 bytes in the horizontal direction and 32 lines in the vertical direction. Further, a rectangular area REC in the frame image FL is allocated to a rectangular area REC' in the memory MEM.

To the memory controller of a general-purpose memory, when a rectangular access is requested, upper-left coordinates and horizontal and vertical sizes of the rectangular area REC' are supplied, as request parameters, so that the memory controller generates a memory address corresponding thereto. However, according to the present embodiment, based on the sixth memory map, a 10-bit data is mapped to an 8-bit data and a packed 2-bit data. Therefore, as shown in FIG. 21, it is necessary to perform coordinate conversion from the coordinate system (X,Y) of the frame image FL to the two-dimensional address (X', Y) of the memory.

As shown in the flowchart shown in FIG. 20, coordinate converter unit 82 acquires a horizontal access start coordinate X1=X and an end coordinate X2=X+Xsize of the frame image FL (S12). Further, coordinate converter unit 82 converts the above coordinates X1, X2 into coordinates X1', X2' of the memory MEM (S14). The conversion formulae therefor are as described in process S14 in FIG. 20.

Figure 22:
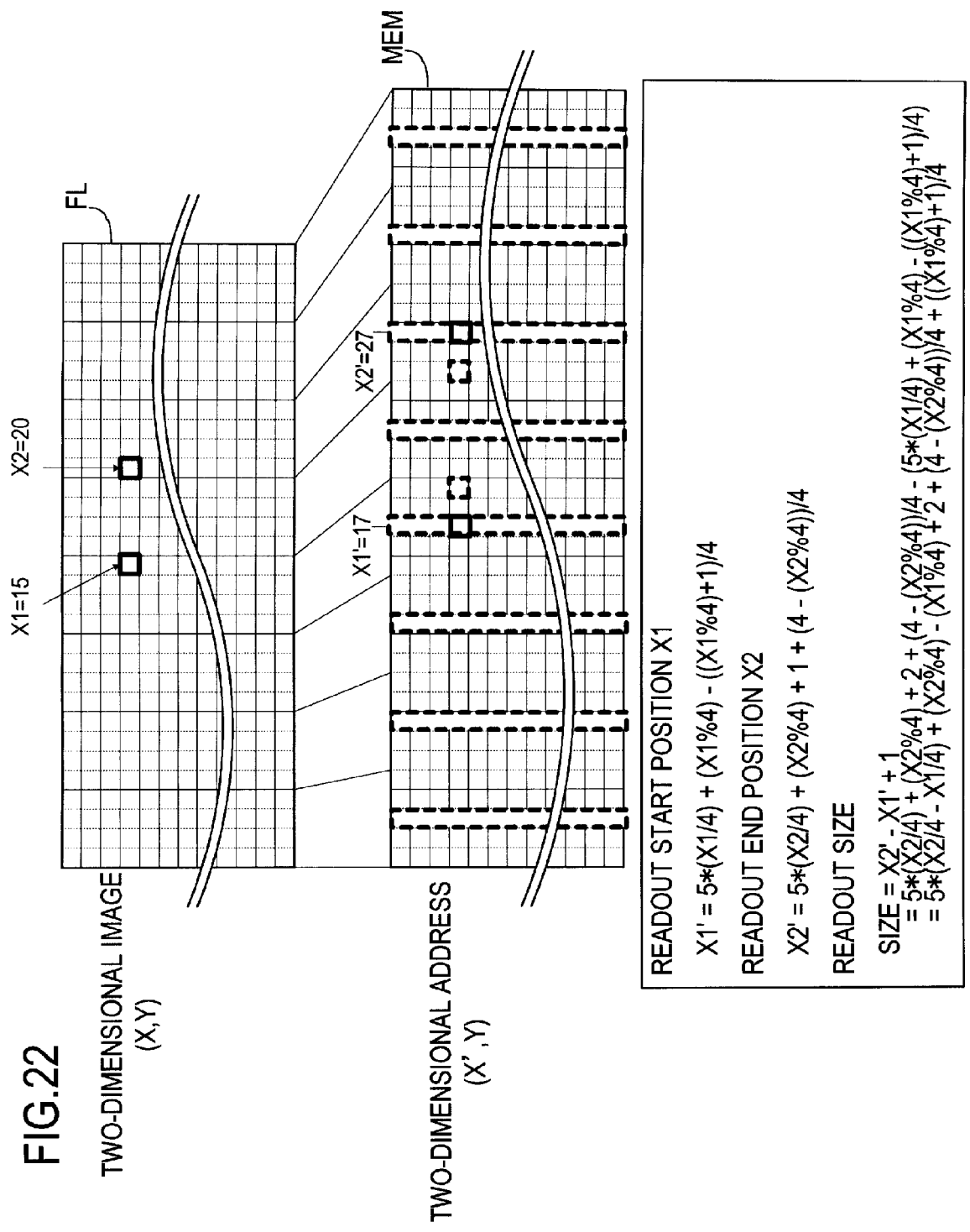
FIG. 22 is a diagram illustrating correspondence between the pixels of the frame image FL and the byte areas of the memory MEM.

FIG. 22 is a diagram illustrating correspondence between the pixels of the frame image FL and the byte areas of the memory MEM. According to the 6th memory map 12-6 in FIG. 10(b), in regard to 10-bit pixel data, 8-bit data for 4 pixels are allocated to 4 byte areas, and packed 2-bit data for 4 pixels are allocated to 1 byte area, respectively, wherein the packed 2-bit data are allocated at the center of the 4 byte areas of 8-bit data. Accordingly, as described in FIG. 22, the 4 pixels in the frame image FL are allocated to the 4 bytes of the 8-bit data and the 1 byte of the 2-bit data, and the coordinate X' is expanded 5/4 times from the coordinate X. Further, as described in FIG. 22, in order to access 10-bit data of a coordinate X1=15, it is necessary to access a byte area of X1'=17, which is moved −2 in the backward direction from X1'=19 that results after X1=15 is expanded 5/4 times. Meanwhile, in order to access 10-bit data of coordinate X2=20, it is necessary to make an access to the byte area of X2'=27, which is moved forward by +2 bytes from X2'=25 that results after X2=20 is expanded 5/4 times.

Conversion formulae to obtain X1', X2' described in FIG. 22 are identical to the formulae described in process S14 of FIG. 20, which are based on the above-mentioned approach. Here, in the conversion formulae, (%) denotes a residual, and in a division (/), figures below the decimal point are omitted.

Further, from the horizontal addresses X1', X2' in the memory, coordinate converter unit 82 calculates upper-left coordinates (X1', Y) and horizontal and vertical sizes (X2'−X1'+1, Ysize) relative to the rectangular area REC' in the two-dimensional memory address.

Figure 23:
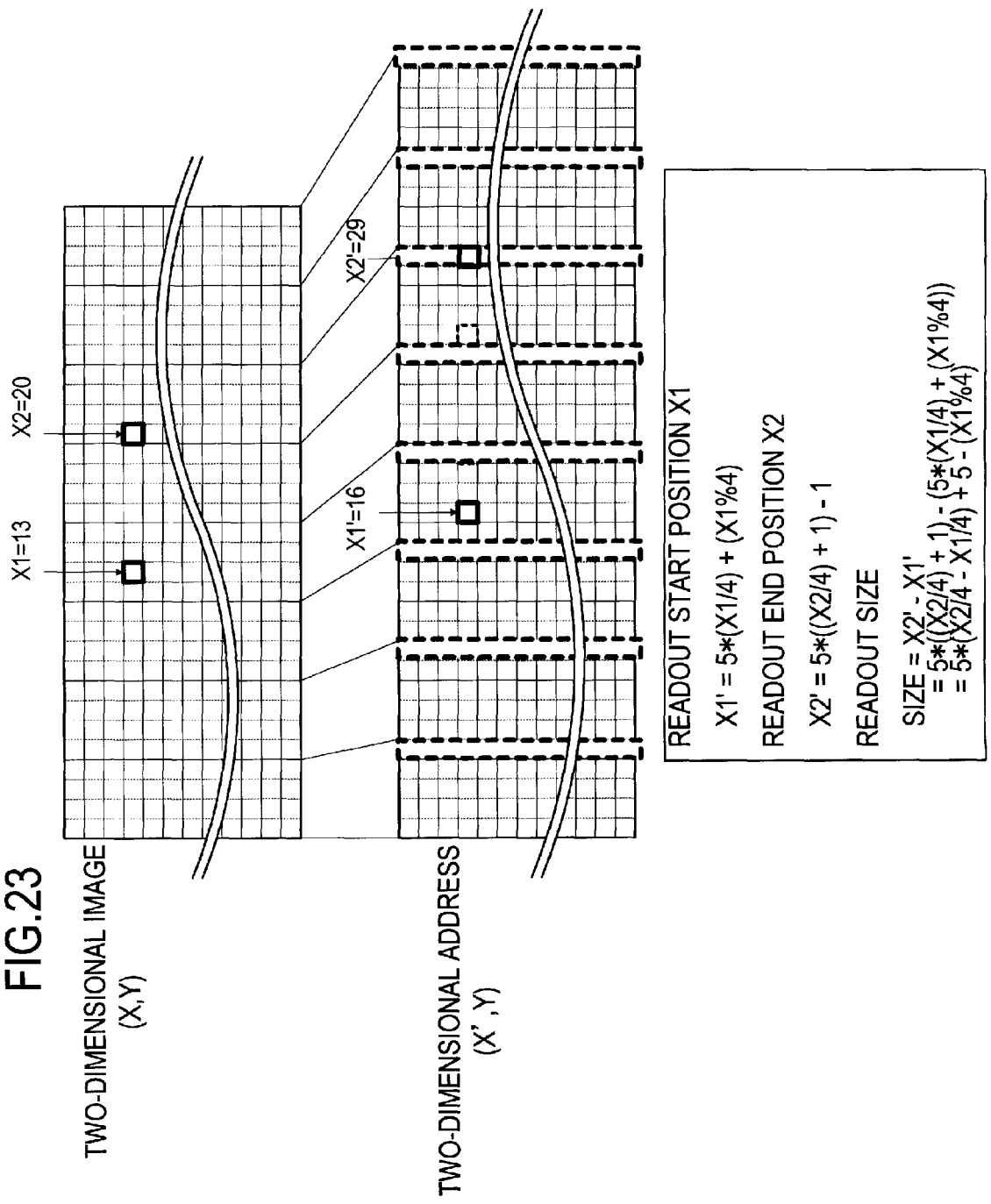
FIG. 23 is a diagram illustrating correspondence between the pixels of the frame image FL and the byte areas of the memory MEM, in case of the fifth memory map 12-5 in FIG. 10(a).

FIG. 23 is a diagram illustrating correspondence between the pixels of the frame image FL and the byte areas of the memory MEM, in case of the fifth memory map 12-5 in FIG. 10(a). In the case of the fifth memory map 12-5, the 8-bit data for 4 pixels and the packed 2-bit data for 4 pixels are arranged alternately. Therefore, an access start address X1' can be obtained by expanding X1 5/4 times. On the other hand, in regard to an access end coordinate X2', it is necessary to expand X2 5/4 times, and further to make an access to the byte area of the 2-bit data corresponding thereto. Accordingly, X1' and X2' are obtained from the calculation formulae described in FIG. 23.

Finally, access controller 83 generates an address and a command from the upper-left coordinates (X1',Y) and the horizontal and vertical sizes (X2'-X1'+1, Ysize) of the rectangular access parameters (S18). In FIG. 21, a calculation formula S18E for obtaining a byte address from the above parameters is described. According to the configuration of the memory MEM, each page area has 2048 bytes, i.e. 64 bytes in the horizontal direction and 32 lines in the vertical direction, and the memory MEM as a whole is configured of 38 pages in the horizontal direction, and 34 pages in the vertical direction. Therefore, a byte address Byte_address in the address space can be obtained by the calculation formula S18E.

A base offset BaseOffset signifies an upper-left byte address of the memory MEM. Now, to obtain the byte address Byte_address of an address (X1',Y), because the address (X1',Y) is positioned in the second page area from the upper left, (Y/32)*38*2048 in the second term of the calculation formula S18E is 0; (X'/64)*2048 in the third term is 2048 because X1'/64=1; (Y %32)*64 in the fourth term is 0 because (Y %32)=0; and (X' %64) in the fifth term is X1'−64. Thus, Byte_address=BaseOffset+2048+X1'−64 is obtained.

From the byte address thus obtained, access controller 83 can obtain bank address BA, row address RA, column address CA and start byte SB of the memory.

In the case of 8-bit access described in FIG. 20, upper-left coordinates (X, Y) and horizontal and vertical sizes (Xsize, Ysize) are acquired, as parameters, along with a rectangular access request (S20). However, there are restrictions of X=4i−2 and Xsize=4j (where i, j are integers) here. In this case, coordinate converter unit 82 obtains a horizontal address X1' using the calculation formula described in the figure (S22). Then, access controller 83 calculates an address to access only 8-bit data (S24), and issues a memory address and a command (S26).

[Memory Having Byte Boundary Function]

Before the explanation of a typical rectangular access operation, an example of a memory having the byte boundary function will be described. As described earlier, the memory having the byte boundary function is described in detail in the Japanese Patent Application No. 2006-345415.

Figure 24:
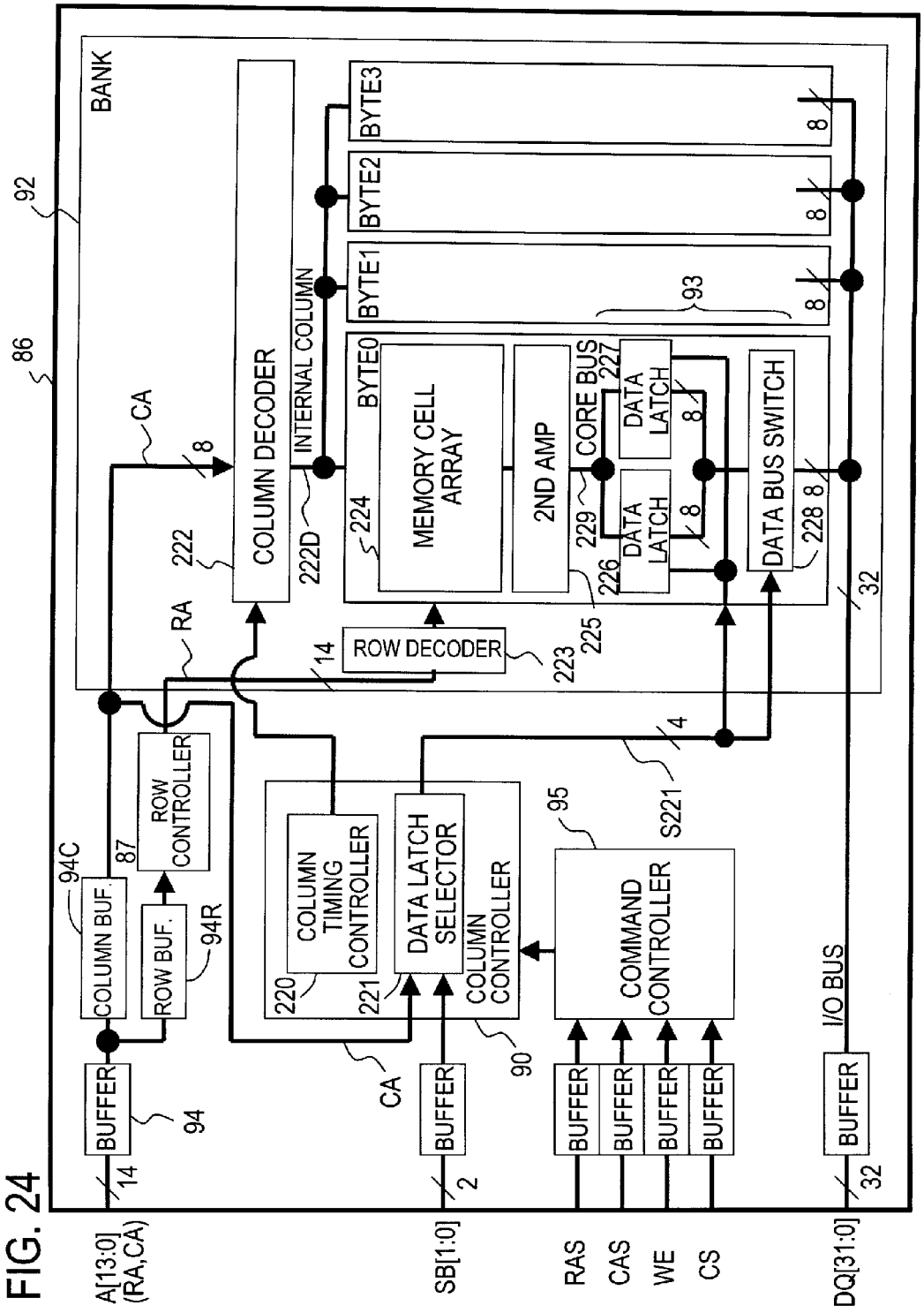
FIG. 24 is a diagram illustrating an example of a memory having the byte boundary function.
Figure 25:
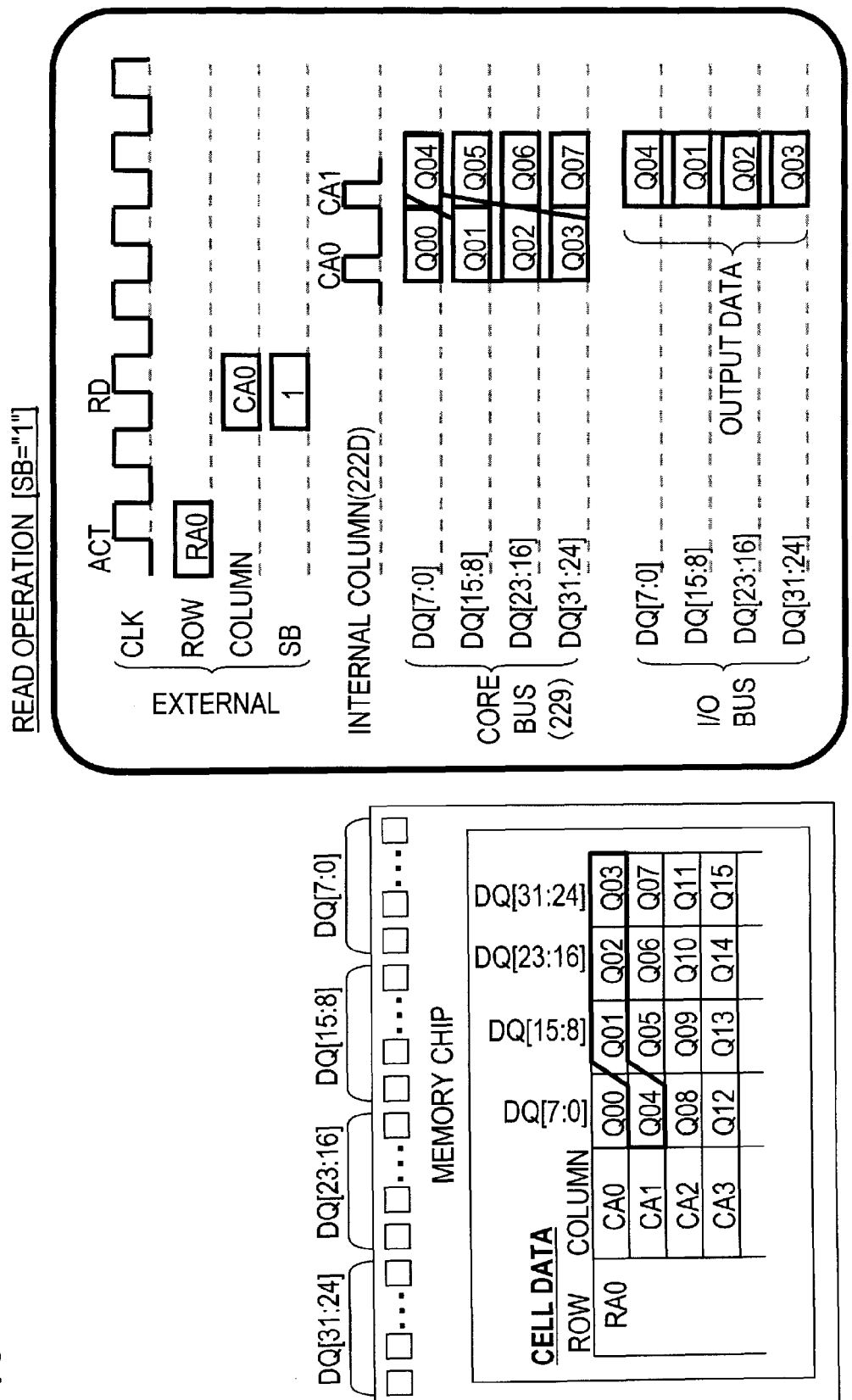
FIG. 25 is a diagram explaining the operation of FIG. 24.

FIG. 24 is a diagram illustrating an example of a memory having the byte boundary function. Also, FIG. 25 is a diagram explaining the operation of FIG. 24.

In FIG. 24, an address signal A is input in a multiple form, and a row address RA is latched in a row address buffer 94R and a column address CA is latched in a column address buffer 94C, respectively. A row controller 87 supplies the row address RA to a row decoder 223 of a selected memory bank 92. Further, the column address CA in column buffer 94C is supplied to a column decoder 222 in the selected memory bank.

In memory bank 92, a memory array is divided into 4 blocks i.e. byte areas Byte0-3. Each byte area includes a memory cell array 224, a second amplifier 225, a pair of data latches 226, 227, and a data bus switch 228, and one byte (8 bits) of data is input/output in one access. Further, from the 4 byte areas, a total of 32 bits (4 bytes) of data are input and output from/to an input/output bus I/O bus. The input/output bus I/O bus is connected to 32-bit input/output terminals DQ0-31 via a buffer. Here, in FIG. 24, only one memory bank 92 is shown, and the other 3 memory banks are omitted.

Column controller 90 includes a column timing controller 220 for controlling the operating timing of column decoder 222, and a data latch selector 221 for controlling both data latch circuits 226, 227 and data bus switch 228. According to the column address CA and the start byte SB, data latch selector 221 controls data latch circuits 226, 227 and data bus switch 228 in each byte area Byte0-3.

As shown in FIG. 25, in the page area of a row address RA0, it is assumed that a 4-byte data, namely from the second byte of the column address CA0 to the first byte of the column address CA1, are to be accessed. Therefore, the start byte SB is 1.

In memory chip 86 shown in FIG. 25, relationship between the memory space and the input/output terminal DQ is shown. In FIG. 25, 4-byte data in a memory unit area selected at one time by the column address CA are shown by Q00-Q15. Namely, 4-byte data Q00-Q03 are selected by the column address CA0, and 4-byte data Q04-Q07 are selected by the column address CA1.

On the right of FIG. 25, a timing chart is shown. First, along with an active command ACT, the row address RA0 is supplied along with a non-illustrated bank address, and thereby a word line in the corresponding bank is driven and a sense amplifier is activated. Thereafter, along with a read common RD, the column address CA0 and the start byte signal SB=1 are supplied. In response thereto, column decoder 222 in the selected memory bank 92 outputs an internal decoded signal 222D corresponding to the column address CA0, and an internal decoded signal 222D corresponding to the column address CA1 that is obtained by incrementing CA0 by 1, to the 4 byte areas Byte0-3 on a time division basis. In each byte area, 2 sets of 1-byte data corresponding to CA0 and CA1 are cached into data latch circuits 226, 227. Then, data bus switch 228 outputs a 1-byte data, which is selected in each byte area according to the combination of CA0 and SB1, from either one of data latch circuits 226 and 227 to the input/output bus I/O bus. Namely, the data Q01, Q02, Q03 corresponding to CA0 and the data Q04 corresponding to CA1 are output to the input/output bus I/O bus. In the case of write operation, 1 byte data is input from the input/output bus to either one of the data latch circuits.

Namely, the column decoder selects a column line (bit line) for 1 byte of each byte area in one access. In the read operation, a data for 1 byte is selected from memory cell array 224 in each byte area, and the data is amplified in the second amplifier 225 and cached in data latch circuits 226, 227. At this time, in each byte area, a memory cell mapped to an identical column address is accessed. In order to achieve the byte boundary access straddling across the boundary of memory unit areas (4-byte word areas) selectable by the column address, after the completion of the first access, column decoder 222 selects a column line again. The address of the above column line is CA1, which is advanced by one address from the previous address CA0. The 1-byte data read out from memory cell array 224 is amplified in the second amplifier, and latched into data latch circuit 227 that is different from the first access.

Accordingly, in data latch circuits 226, 227, because there exist 8 bytes of data, which are twice as large as 4 bytes required for the input/output terminal DQ in one access, data bus switch 228 selects one byte of data, which is half the 2-byte data cached in the data latch circuits in each byte area, and transfers the data to the input/output bus I/O bus. According to the column address CA0 and the start byte signal SB=1, data latch selector 221 controls both cache operation to data latch circuits 226, 227 in each byte area and switch operation of data bus switch 228. By this, it is possible to transfer the byte data corresponding to the different column addresses CA0, CA1, from each byte area to the input/output bus I/O bus.

As a result, 4 bytes of data Q04, Q01, Q02, Q03 are respectively transferred to the input/output terminal DQ, via the input/output bus I/O bus, as shown in FIG. 25. As such, an input/output unit 93 is configured of second amplifier 225, data latch circuits 226, 227 and data bus switch 228.

[Rectangular Access Operation]

Next, the operation of a memory controller and a memory in a typical rectangular access will be described.

Figure 26:
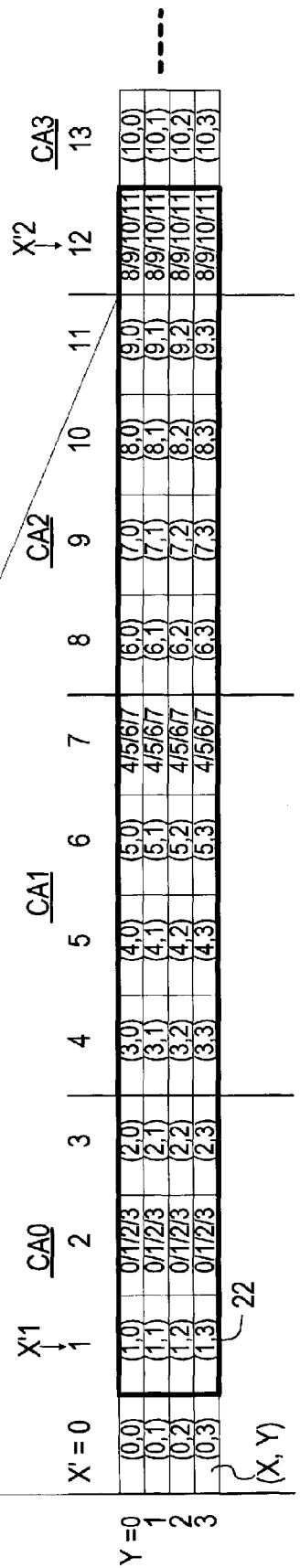
FIG. 26 is a diagram illustrating relationship between a rectangular access area 22 and a memory map in a page.

FIG. 26 is a diagram illustrating relationship between a rectangular access area 22 and a memory map in a page. In the page area Page identified by a bank address BAm and a row address RAn, 512 memory unit areas (word areas) selected by column addresses CA0-CA511 are allocated. Further, in an enlarged rectangular area 22, relationship between coordinates (X,Y) of a frame image and a two-dimensional address (X',Y) of the memory is shown.

Now, a case of accessing 10-bit data of a frame image, having upper-left coordinates (X,Y)=(1,0) with a rectangular size (8,4), is assumed. In this case, in the coordinates (X,Y) of the frame image, rectangular access area 22 includes coordinates (1,0)-(8,0), (1,1)-(8,1), (1,2)-(8,2) and (1,3)-(8,3). In contrast, in the two-dimensional address (X',Y) of the memory, rectangular access area 22 includes addresses (1,0)-(12,0), (1,1)-(12,1), (1,2)-(12,2) and (1,3)-(12,3). The reason is that packed 2-bit data are stored in X'=2, 7 and 12 of the memory. In other words, in order to access a pixel data of X=8, it is also necessary to access the 2-bit data thereof (X'=12), and therefore, an access start address X1' becomes 1, and an access end address X2' becomes 12.

Now, by referring to the data mapping unit 84 in the memory controller of FIG. 19, a memory access to the above-mentioned rectangular area 22 including 10-bit read and write operation and 8-bit read operation will be described successively.

Figure 27:
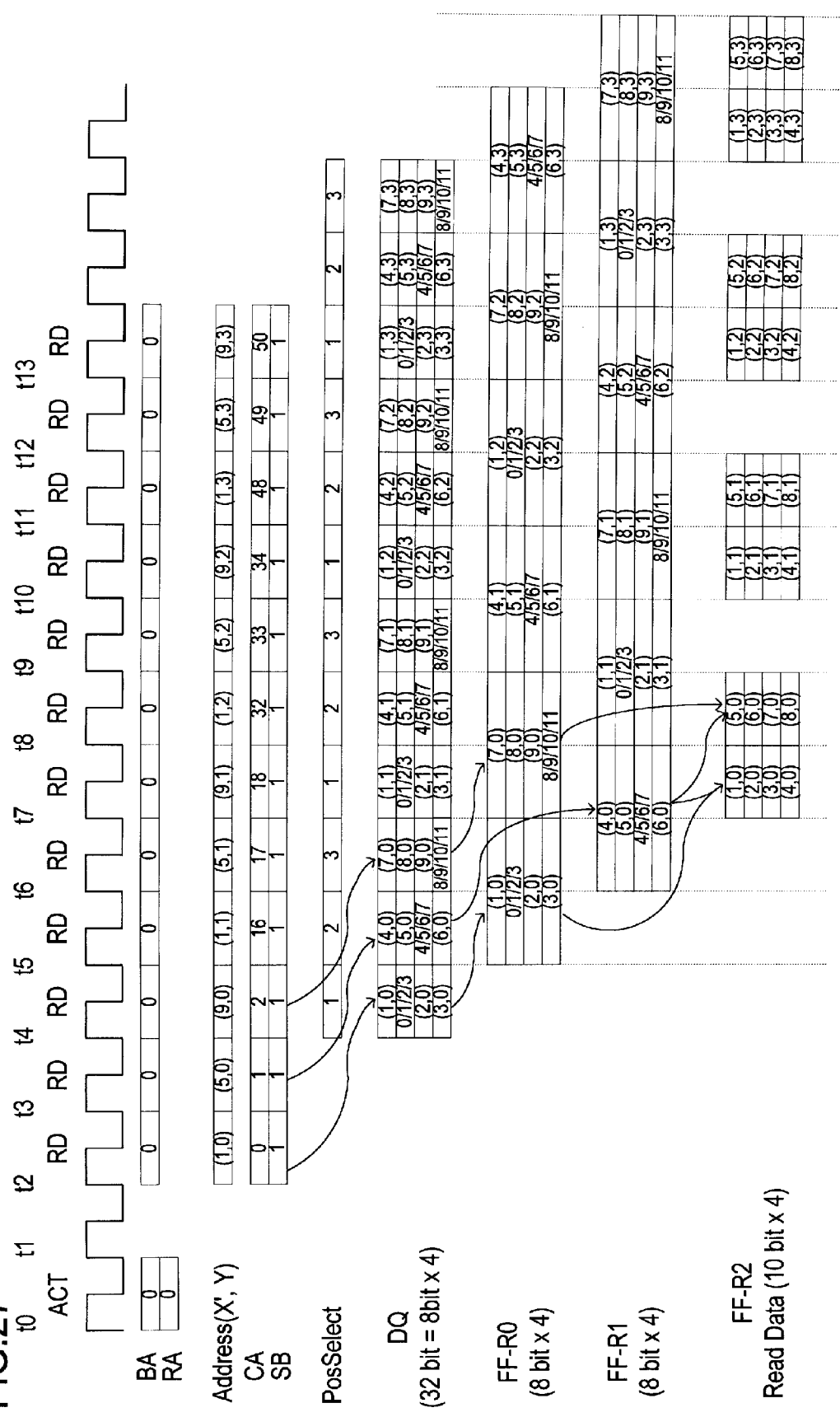
FIG. 27 is a diagram illustrating the read operation of 10-bit data.

FIG. 27 is a diagram illustrating the read operation of 10-bit data. There is shown an exemplary case that CAS latency is 2. First, at time t0, the memory controller issues a bank address BA0 and a row address RA0, along with an active command ACT. By this, the word line of the page area Page shown in FIG. 26 is driven, and a sense amplifier amplifies a stored data.

Next, in order to output 4 bytes of data from a two-dimensional address (1,0) in the memory, at time t2, the memory controller issues a column address CA0 and a start byte SB1, along with a read command RD. At time t4 after the lapse of CAS latency CL=2, memory 86 outputs 8-bit data of a pixel (1,0), 2-bit data of pixels 0/1/2/3 and 8-bit data of pixels (2,0), (3,0) to the 32-bit data terminal DQ. Further, access controller 83 in the memory controller outputs a fractional data position selection signal PosSelect=1 to a selection controller 841.

Then, at time t5, the 32-bit data being output from the memory is stored into the flip-flop FF-R0 of memory controller 80.

The access controller 83 obtains the fractional data position selection signal PosSelect according to the memory map, at the time of address calculation. Further, on receiving an access request REQ, the access controller 83 outputs, to selection controller 841, size information SIZE of the access rectangle and a signal K/N indicative of either 10-bit access or 8-bit access.

At time t3, the memory controller issues a column address CA1 and a start byte SB1, along with a read command RD. By this, 4 bytes of data are accessed from a two-dimensional address (5,0) in the memory. At time t5 after the lapse of CAS latency CL=2, memory 86 outputs 8-bit data of pixels (4,0) and (5,0), 2-bit data of pixels 4/5/6/7 and 8-bit data of pixel (6,0) to the 32-bit data terminal DQ. Further, access controller 83 in the memory controller outputs a fractional data position selection signal PosSelect=2 to selection controller 841. Then, at time t6, the 32-bit data being output from the memory is stored into the other flip-flop FF-R1 of memory controller 80.

Then, at time t7, by the control of selection controller 841, the read selector SEL-R in the memory controller selects 8-bit data and 2-bit data of each pixel from the data stored in the two flip-flops FF-R0, FF-R1, and stores 10-bit data of pixels (1,0), (2,0), (3,0) and (4,0) into the flip-flop FF-R2. By this, the data of a data unit output from the memory are rearranged into 10-bit data. Then, the memory controller outputs the above 10-bit data of 4 pixels via a read buffer 842.

Similarly, at time t4, in order to access 4 bytes of data from a two-dimensional address (9,0) in the memory, the memory controller issues a column address CA2 and a start byte SB=1, along with a read command RD. At time t6 after the lapse of CAS latency CL=2, memory 86 outputs 8-bit data of pixels (7,0), (8,0) and (9,0) and 2-bit data of pixels 8/9/10/11 to the 32-bit data terminal DQ. Further, access controller 83 in the memory controller outputs a fractional data position selection signal PosSelect=3 to selection controller 841. Then, at time t7, the 32-bit data being output from the memory is stored into the flip-flop FF-R0 of memory controller 80.

Then, at time t8, by the control of selection controller 841, the read selector SEL-R in the memory controller stores 10-bit data of pixels (5,0), (6,0), (7,0) and (8,0) into the flip-flop FF-R2. Then, the above 10-bit data of 4 pixels are output via read buffer 842.

In regard to the second row and after, 10-bit access is performed in a similar manner. As such, by the data mapping according to the sixth memory map, and by the use of the memory having the byte boundary function, it is possible to access 10-bit data of 8 pixels by the issue of the read commands three times, which produces high access efficiency. Then, data mapping unit 84 in memory controller 80 rearranges and reallocates 8-bit data and 2-bit data being read out from the memory, so as to output 10-bit data of each pixel. Thus, to read out 10-bit data of 8×4 pixels in rectangular area 22, it is sufficient if the read commands RD are issued twelve times.

Figure 28:
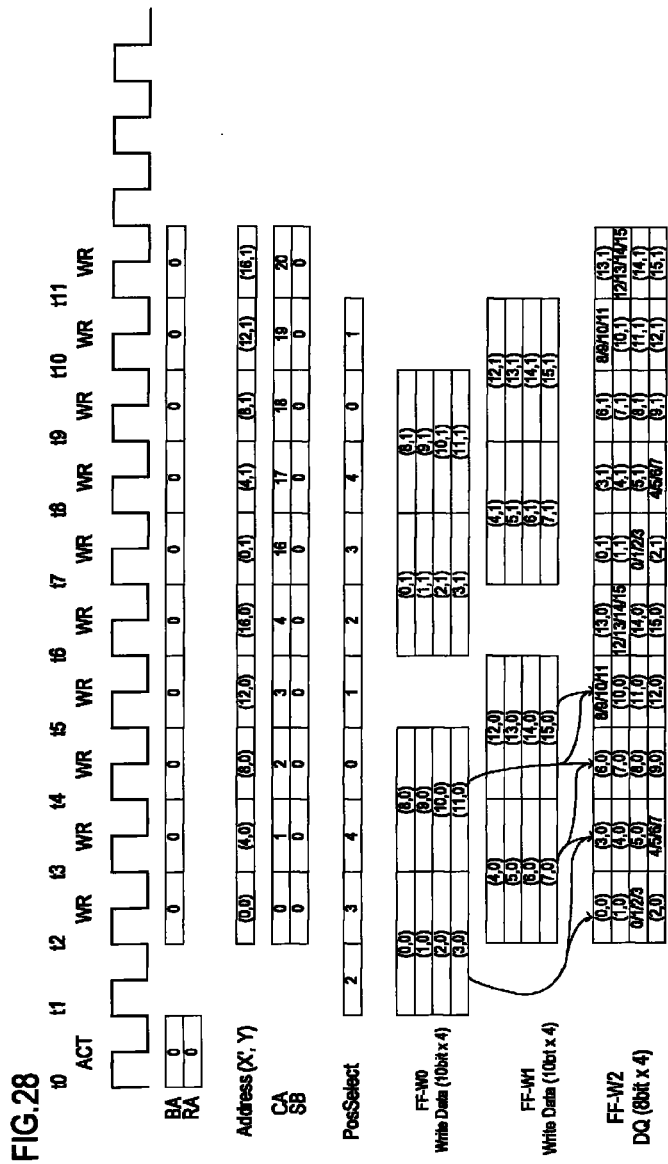
FIG. 28 is a diagram illustrating 10-bit write operation.

FIG. 28 is a diagram illustrating 10-bit write operation. Here, a rectangular area to be write-accessed is from the upper-left coordinates (0,0) with a rectangular size 16×2, and a 10-bit data is to be written thereto. In this case, 4-byte data are written from two-dimensional addresses (0,0), (4,0), (8,0), (12,0), (16,0), (0,1), (4,1), (8,1), (12,1) and (16,1), respectively, and column addresses corresponding thereto are CA0, 1, 2, 3, 4, 16, 17, 18, 19 and 20. Further, the byte boundary function is not necessary, and a start byte SB is 0.

At time t0, the memory controller issues an active command ACT, along with a bank address BA0 and a row address RA0. Then, at time t1, the memory controller stores 10-bit data of pixels (0,0)-(3,0), stored in the write buffer 843, into a flip-flop FF-W0. At this time, access controller 83 outputs a fractional data position selection signal PosSelect=2. Further, at time t2, the memory controller stores 10-bit data of pixels (4,0)-(7,0), stored in write buffer 843, into another flip-flop FF-W1. At this time, access controller 83 outputs a fractional data position selection signal PosSelect=3.

At time t2, based on size information SIZE, fractional data selection signal PosSelect=2 and the memory map, a selector SEL-W in the memory controller stores, into a flip-flop FF-W2, 8-bit data of pixels (0, 0) and (1, 0), 2-bit data of pixels 0/1/2/3 and 8-bit data of pixel (2,0) in this order. At the same time, access controller 83 issues a column address CA0 and a start byte SB0 to the memory, along with a write command WR. By this, the 32-bit data stored in the flip-flop FF-W2 are written into the 4-byte area of two-dimensional addresses (0,0)-(3,0) of the memory.

Thereafter, similarly, the memory controller divides 10-bit data, supplied from an upper-level processor, into 8-bit data and 2-bit data, arrays the 8-bit data and the 2-bit data on the basis of 32 bits according to the memory map, and outputs to the memory along with the write command RD.

In the aforementioned case, the rectangular access of upper-left coordinates (0,0) with rectangular size 16×2 is performed by accessing ten times according to the write commands WR.

Next, access operation in regard to 8-bit data will be described. As having been explained by the flowchart shown on the right side of FIG. 20, the request parameters of an 8-bit data access request are restricted to: horizontal access start coordinates X=4i−2 (i is an integer)=2, 6, 10 . . . , and horizontal size is 4j (j is an integer)=4, 8, 12, . . . By such the restriction, as is apparent from the memory map shown in FIG. 26, 8-bit data to be accessed are inevitably 8-bit data stored in consecutive 4 bytes.

Then, according to the memory map, coordinate converter unit 82 obtains horizontal coordinates X1' in the memory, using X1'=5*((X−2)/4)+3. By the aforementioned restriction, the address X1' always indicates the top address of consecutive 8-bit data of 4 pixels. To the 8-bit data access of horizontal 4 pixels, the horizontal addresses are updated on the basis of every 5 bytes. Therefore, by advancing the address by 5 bytes from the horizontal start address X1', each time 1-word (4-byte) data is to be read out, it is possible to access 8-bit data only.

Figure 29:
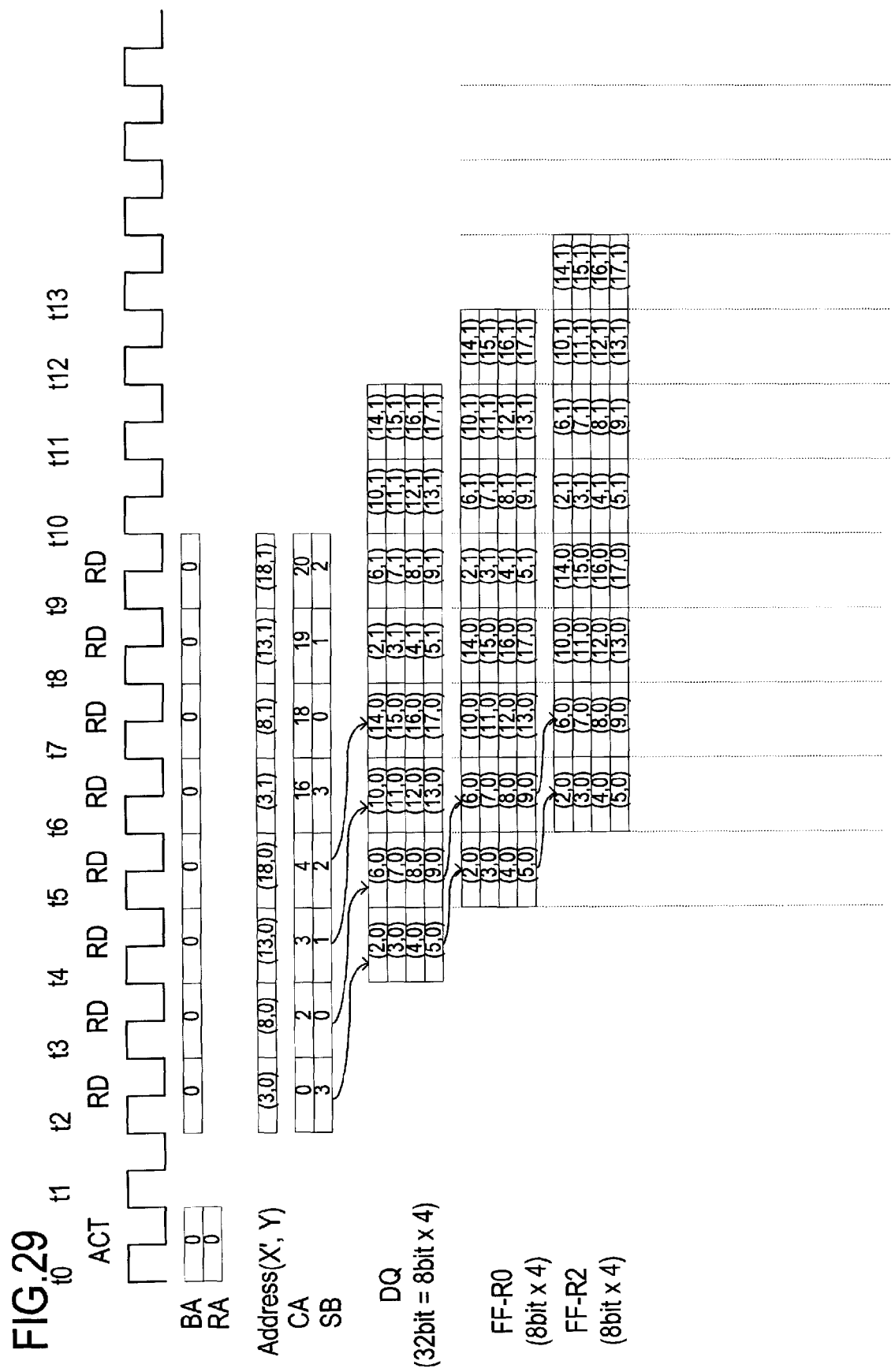
FIG. 29 is a diagram illustrating 8-bit read operation.

FIG. 29 is a diagram illustrating 8-bit read operation. Here, 8-bit data of a rectangle having upper-left coordinates (2,0) with a rectangular size 16×2 is to be accessed. The memory controller issues a bank active command ACT, and subsequently issues read commands RD. According to the present memory map, it is necessary to access each 4-byte data from two-dimensional addresses (3,0), (8,0), (13,0), (18,0), (3,1), (8,1), (13,1) and (18,1) in the memory. The column addresses CA corresponding thereto are CA0, 2, 3, 4, 16, 18, 19 and 20, respectively. Further, because of the access of only 8-bit data by use of the byte boundary function, start bytes SB become SB=3, 0, 1, 2, 3, 0, 1 and 2. Corresponding to the issue of the above read commands, 8-bit data are output from the memory, as read data.

For example, at time t0, the memory controller issues the active command ACT, and at time t2, issues a column address CA0 and a start byte SB=3, along with the read command RD. After the lapse of CAS latency CL=2, at time t4, the memory outputs a total of 32 bits of 8-bit data for pixels (2,0), (3,0), (4,0) and (5,0). At time t5, the memory controller stores the above 8-bit data into the flip-flop FF-R0, and at time t6, stores the data into the flip-flop FF-R2, so as to output via read buffer 842. In other words, in the case of 8-bit data, because it is not necessary to perform rearrangement with fractional 2-bit data, it is sufficient if data mapping unit 84 simply transfers 32 bits of 8-bit data in a pipeline manner. Accordingly, the flip-flop FF-R1 is not used.

In 8-bit write operation, similar to the above-mentioned read operation, the memory controller issues a column address CA and a start byte SB along with a write command WR, so as to store 8-bit data for 4 pixels, constituted of 32 bits, into the memory.

As having been described above, the memory controller according to the present embodiment can access the memory according to either 10-bit data access or 8-bit data access, and according to access parameters, based on the memory map.

According to the present embodiment, access efficiency is increased by arranging data having a different bit length from a multiple of 8 bits, a data unit of the general-purpose memory, in the general-purpose memory, based on the memory map. Now, an example of accessing 10-bit image data on the basis of 10-bit or upper 8-bit will be explained below.

Figure 30:
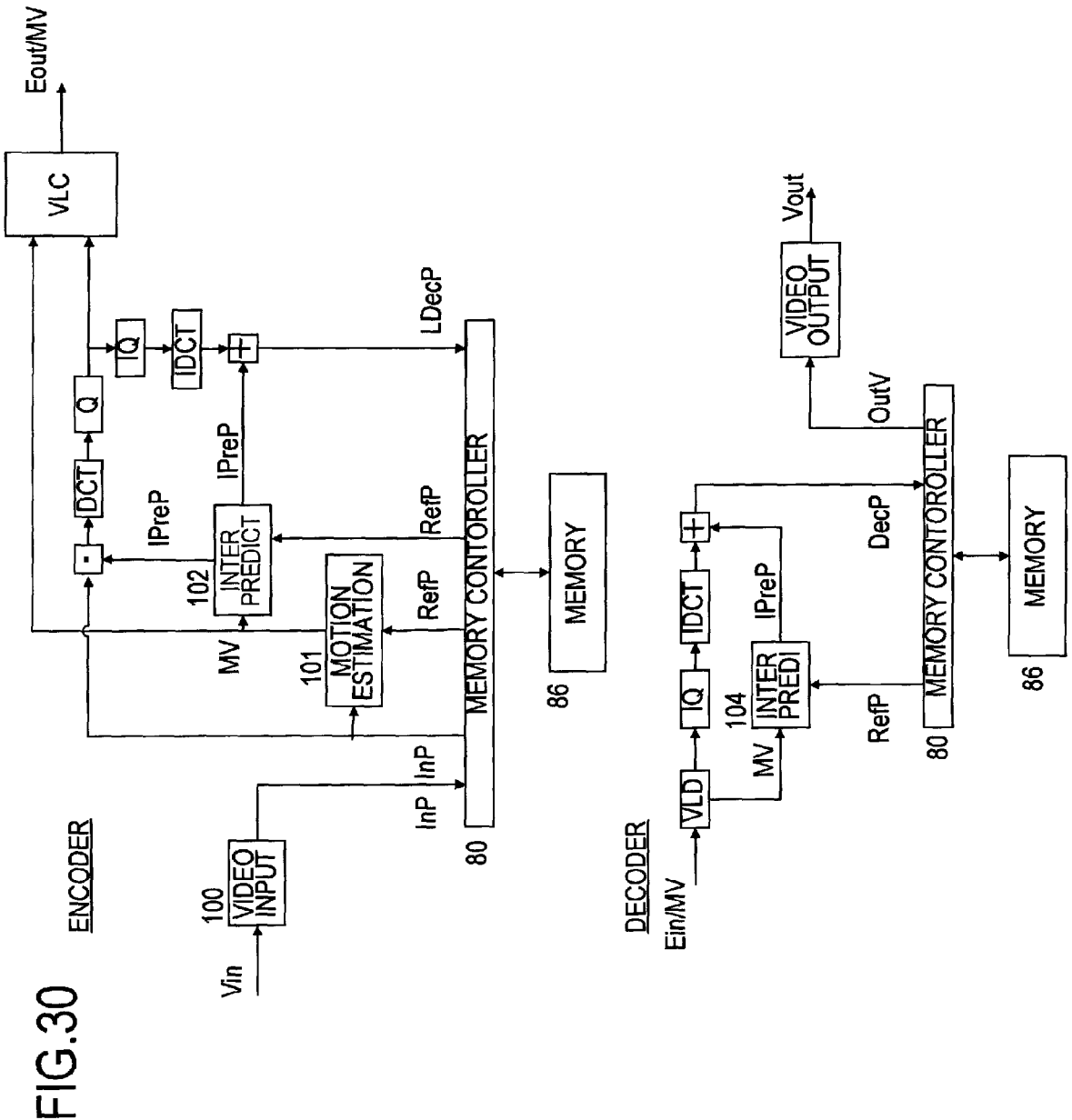
FIG. 30 is a configuration diagram of an MPEG encoder and decoder.

FIG. 30 is a configuration diagram of an MPEG encoder and decoder. In a general MPEG encoder, access to a frame memory is broadly classified into readout of a present image, readout of a reference image for motion vector search (motion estimation), readout of a reference image for inter-prediction, and write of a local decoded image.

Now, a flow of inter-prediction encoding processing in the MPEG encoder will be explained. The encoding processing is performed on the basis of a unit of vertical 16 pixels and horizontal 16 pixels, which is referred to as a macro block. First, an input image Vin is stored into memory 86 via an image input unit 100, as a present image InP. A motion vector search unit 101 then calculates a motion vector MV by reading out from the memory the present image InP and a reference image RefP for motion vector search. In general, the motion vector search is made by searching a reference image search area by means of block matching of an image having most resemblance to the present image.

Next, according to the obtained motion vector MV, an inter-prediction unit 102 reads out the reference image RefP necessary for generating an inter-prediction image, so as to generate an inter-prediction image IpreP. Then, inter-prediction unit 102 calculates a difference between the generated inter-prediction image IpreP and the present image InP, and generates an encoded data Eout by performing discrete cosine transform (DCT), quantization (Q) and variable length coding (VLC). Meanwhile, in regard to the data after quantization, a local decoded image (LdecP) is generated through inverse quantization (IQ), inverse discrete cosine transform (IDCT) and motion compensation processing (addition to the inter-prediction image IpreP). The local decoded image is stored into memory 86, as an image to be referred to later. An encoded data Eout is output along with the motion vector MV.

Among the aforementioned four types of memory access to be performed in the encoding processing, in regard to the readout of present images, the readout of reference images for inter-prediction and the write of local decode images, calculation accuracy is specified in the standard, and therefore it is necessary to access on the basis of 10-bit data per pixel. On the other hand, in regard to access to read out reference images for motion vector search, the purpose thereof is to calculate motion vectors. The calculation accuracy thereof is not particularly specified, and is dependent on an encoder.

Further, generally, the access amount of reference images for motion vector search is large, and occupies most access amount in the MPEG encoder. Therefore, by the execution of the above access on the basis of each upper 8-bit data, it is possible to reduce the access amount in the encoder. At the same time, by performing the motion vector search using the upper 8-bit data of each pixel data, it is also possible to reduce the circuit scale of an arithmetic unit for block matching.

Next, a flow of inter-prediction decoding processing in the MPEG decoder will be described. The decoding processing is performed on the basis of a unit of vertical 16 pixels and horizontal 16 pixels, which is referred to as a macro block. First, after an encoded image Ein is input, variable length decoding processing (VLD) is performed, and a motion vector MV and DCT coefficient data are extracted. The motion vector MV is input into an inter-prediction image generator unit 104. The inter-prediction image generator unit 104 reads out, from memory 86, reference image RefP necessary for prediction image generation, and generates an inter-prediction image IpreP. Meanwhile, in regard to the DCT coefficient, a decoded image DecP is generated through inverse quantization (IQ), inverse discrete cosine transform (IDCT) and motion compensation processing (addition to the inter-prediction image). The generated decoded image DecP is stored into memory 86, and is used as the reference image RefP thereafter or a display image Out V.

In the decoding processing, 10 bits i.e. the entire bits in the pixel are required because the calculation accuracy is specified. On the other hand, in regard to the display image OutV, there are cases of being restricted to a display output range to be displayed thereon. If the output range has 8-bit accuracy, lower 2 bits may be unnecessary. Thus, according to the present embodiment, it is possible to employ 10-bit data access in regard to the MPEG decoding processing and upper 8-bit data access in regard to the display.

Further, even in case that the display output range is 10 bits, it may also be possible to use the readout of upper 8-bit data. For example, for the purpose of obtaining higher image quality of the decoded image, when calculating an image feature amount to perform motion detection processing between preceding and subsequent images, the upper 8-bit data access may be considered to reduce memory access amount and an arithmetic unit. In such a case, it is possible to perform 10 bits/pixel in regard to access for display, and 8 bits/pixel in regard to access to preceding and subsequent images to calculate the feature amount.

According to the present invention, it is possible to efficiently store data having a bit length other than a multiple of a data unit bit length (8 bits, for example) into a general-purpose memory.

By the application of the memory map system according to the present embodiment, in regard to pixel data each having a bit width not matched with the bit length (8 bits) of memory data unit, it is possible to increase access efficiency and minimize the number of access cycles, in both entire bit access of pixel data and partial (8 bit) access of pixel data. In particular, it is useful when applying to a device in which rectangular accesses frequently occur, such as a case of reference image access in an MPEG decoder and encoder.

All examples and conditional language recited herein are intended for pedagogical purposes to aid the reader in understanding the invention and the concepts contributed by the invent or to furthering the art, and are to be construed as being without limitation to such specifically recited examples and conditions, nor does the organization of such examples in the specification relate to a showing of the superiority and inferiority of the invention. Although the embodiment (s) of the present inventions have been described in detail, it should be understood that the various changes, substitutions, and alterations could be made hereto without departing from the spirit and scope of the invention.

The invention claimed is:

1. A memory controller for controlling a memory having areas of data unit of K bits, comprising:
a data mapping unit dividing N bits of data, where N is not a multiple of K, into K bits and (N−K) bits, and in regard to L pieces of the N bits of data, arranging L K-bit data into L data units, and arranging L (N−K)-bit data into M(M=L×(N−K)/K) data units by packing; and
an access control unit access-controlling the memory to access the L K-bit data as L data units, and access-controlling the memory to access the packed L (N−K)-bit data as M data units,
wherein the access control unit stores the L K-bit data and the packed L (N−K)-bit data into consecutive (L+M) data unit areas in the memory.

2. The memory controller according to claim 1, wherein the access control unit stores the L K-bit data and the packed L (N−K)-bit data into consecutive (L+M) data unit areas in the memory by arranging the packed L (N−K)-bit data to the center of the L K-bit data.

3. The memory controller according to claim 1, wherein the access control unit stores the L K-bit data and the packed L (N−K)-bit data into consecutive data unit areas in the memory by arranging the packed L (N−K)-bit data before or after the L K-bit data.

4. The memory controller according to claim 1, wherein the access control unit stores the L K-bit data and the packed L (N−K)-bit data into consecutive (L+M) data unit areas in the memory by arranging the packed L (N−K)-bit data in among the L K-bit data in a distributed manner.

5. The memory controller according to claim 1,
wherein the memory includes a plurality of memory unit areas selected by addresses supplied from the memory controller, and
wherein the bit length of the L K-bit data is a multiple of the bit length of the memory unit area.

6. The memory controller according to one of claim 1,
wherein the memory includes a plurality of memory unit areas selected by addresses supplied from the memory controller, and
wherein the bit length of the L K-bit data is a multiple of the bit length of the memory unit area, and
wherein the bit length of the packed L (N−K)-bit data is a multiple of the bit length of the memory unit area.

7. The memory controller according to claim 1, wherein, in write operation, the data mapping unit arranges the N-bit data supplied from an upper-level system into the L K-bit data and the packed L (N−K)-bit data, and in read operation, rearranges the L K-bit data and the packed L (N−K)-bit data supplied from the memory into L N-bit data.

8. The memory controller according to claim 1, wherein, in response to an N-bit access request from an upper-level system, the access control unit writes into the memory, or reads out from the memory, the L K-bit data and the packed L (N−K)-bit data, and in response to a K-bit access request from the upper-level system, the access control unit writes into the memory, or reads out from the memory, the L K-bit data.

9. The memory controller according to claim 1, wherein the K bits equal 8 bits.

10. A memory controller for controlling a memory having areas of data unit of K bits and having a plurality of memory unit areas selected by supplied addresses, comprising:
a data mapping unit dividing N bits of data, where N is not a multiple of K, into K bits and (N−K)-bits, and in regard to L pieces of the N bits of data, arranging L K-bit data into L data units and arranging L (N−K)-bit data into M (M=L×(N−K)/K) data units by packing; and
an access control unit access-controlling the memory to access the L K-bit data as L data units, and access-controlling the memory to access the packed L (N−K)-bit data as M data units,
wherein the bit length of the L K-bit data is a multiple of the bit length of the memory unit area, and
wherein the access control unit stores the L K-bit data and the packed L (N−K)-bit data into consecutive (L+M) data unit areas of the memory by arranging the packed L (N−K)-bit data to the center of the L K-bit data.

11. The memory controller according to claim 10,
wherein, in response to an access request from the upper-level system, the access control unit supplies to the memory an operation command, an address and position information of an access start data unit in the memory unit area, and access-controls data, having the bit length of the memory unit area, starting from the data unit corresponding to the position information in the memory unit area selected by the address in the memory.

12. A memory controller for controlling a memory having areas of data unit of K bits and having a plurality of memory unit areas selected by supplied addresses, comprising:
a data mapping unit dividing N bits of data supplied from an upper-level system, where N is not a multiple of the K, into K bits and (N−K)-bits, and in regard to L pieces of the N bits of data, arranging L K-bit data into L data units, and arranging L (N−K)-bit data into M (M=L×(N−K)/K) data units by packing; and
an access control unit access-controlling the memory to access the L K-bit data as L data units, and access-controlling the memory to access the packed L (N−K)-bit data as M data units,
wherein both the bit length of the L K-bit data and the bit length of the packed L (N−K)-bit data are multiplies of the bit length of the memory unit area, and
wherein the access control unit stores the L K-bit data and the packed L (N−K)-bit data into consecutive (L+M) data unit areas of the memory by arranging the packed L (N−K)-bit data before or after the L K-bit data.

13. The memory controller according to claim 12,
wherein, in response to an access request from an upper-level system, the access control unit supplies an operation command and an address to the memory, and access-controls data in a memory unit area of the memory selected by the address.

14. A memory system comprising:
the memory controller in claim 1; and
a memory having areas of data unit of the K bits.

15. The memory system according to claim 14, wherein the K bits equal 8 bits.

16. A memory system comprising:
the memory controller in claim 10; and
a memory having areas of data unit of the K bits and having a plurality of the memory unit areas.

17. A memory system comprising:
the memory controller in claim 10, wherein, in response to an access request from the upper-level system, the access control unit supplies to the memory an operation command, an address and position information of an access start data unit in the memory unit area, and access-controls data, having the bit length of the memory unit area, starting from the data unit corresponding to the position information in the memory unit area selected by the address in the memory; and a memory having areas of data unit of the K bits and having a plurality of the memory unit areas, wherein, in response to the operation command, the address and the position information, the memory writes or reads out data having the bit length of the memory unit area with the start from a data unit corresponding to the position information in the memory unit area selected by the address.

* * * * *